United States Patent
Odutola

(10) Patent No.: US 10,445,844 B2
(45) Date of Patent: *Oct. 15, 2019

(54) SYSTEM AND METHOD FOR DETECTING, PROFILING AND BENCHMARKING INTELLECTUAL PROPERTY PROFESSIONAL PRACTICES AND THE LIABILITY RISKS ASSOCIATED THEREWITH

(71) Applicant: Bayo Odutola, Ottawa (CA)

(72) Inventor: Bayo Odutola, Ottawa (CA)

( * ) Notice: Subject to any disclaimer, the term of this patent is extended or adjusted under 35 U.S.C. 154(b) by 0 days.

This patent is subject to a terminal disclaimer.

(21) Appl. No.: 16/181,971

(22) Filed: Nov. 6, 2018

(65) Prior Publication Data

US 2019/0073731 A1 Mar. 7, 2019

Related U.S. Application Data

(63) Continuation of application No. 15/594,558, filed on May 12, 2017.

(51) Int. Cl.
*G06Q 40/06* (2012.01)
*G06Q 50/18* (2012.01)

(52) U.S. Cl.
CPC ........... *G06Q 50/184* (2013.01); *G06Q 40/06* (2013.01)

(58) Field of Classification Search
CPC ........ G06Q 10/00; G06Q 20/00; G06Q 30/00; G06Q 40/00
USPC ...................................................... 705/3–44
See application file for complete search history.

(56) References Cited

U.S. PATENT DOCUMENTS

| 7,536,312 B2 * | 5/2009 | Block ............... G06Q 10/0635 705/7.35 |
| 7,552,480 B1 * | 6/2009 | Voss ...................... G06F 21/577 380/277 |
| 7,853,515 B2 * | 12/2010 | Harrison, Jr. ...... G06Q 30/0601 705/35 |

(Continued)

OTHER PUBLICATIONS

Bedovsky, "Financialization as calculative practice: the rise of structured finance and the cultural and calcualtive transformation of credit rating agencies", Socio-Economic Review, 2018, vol. 16, No. 1, 61-84, doi: 1093/ser/mwx043. (Year: 2017).*

(Continued)

*Primary Examiner* — Frantzy Poinvil
(74) *Attorney, Agent, or Firm* — Brian Raffoul; Dennis Haszko

(57) ABSTRACT

A computer-implemented method and system for detecting, profiling and benchmarking Intellectual Property (IP) law professional liability risks and professional liability insurance risks and value associated with IP prosecution and maintenance processes for IP business entities, including IP law firms and independent IP professionals. The method and system enable an insurance firm to accurately quantify professional liability risk of a new or existing IP business client and mitigate such risks. The method accesses and collects transaction data indicative of risk-reducing and risk-increasing behavior of an IP business entity from a National IP Office in a chosen jurisdiction (e.g., USPTO PAIR system) and sends the transaction data to a back-end computer system for processing and analysis.

20 Claims, 14 Drawing Sheets

(56) References Cited

U.S. PATENT DOCUMENTS

| | | | | |
|---|---|---|---|---|
| 7,877,319 B2* | 1/2011 | Miles | ................. | G06Q 40/00 |
| | | | | 705/35 |
| 8,468,244 B2* | 6/2013 | Redlich | ................. | G06Q 10/06 |
| | | | | 709/225 |
| 9,183,278 B2 | 11/2015 | Pogodin | | |
| 9,305,278 B2 | 4/2016 | Gross et al. | | |
| 2007/0005477 A1* | 1/2007 | McAtamney | ....... | G06F 3/04845 |
| | | | | 705/35 |
| 2009/0307014 A1* | 12/2009 | Block | ................. | G06Q 10/0635 |
| | | | | 705/4 |
| 2011/0295757 A1* | 12/2011 | Malackowski | ........ | G06Q 40/04 |
| | | | | 705/310 |
| 2012/0239593 A1* | 9/2012 | von der Borch | ...... | G06Q 40/00 |
| | | | | 705/36 R |
| 2014/0380488 A1* | 12/2014 | Datta Ray | ........... | H04L 63/1433 |
| | | | | 726/25 |
| 2015/0348217 A1 | 12/2015 | Lundberg | | |
| 2016/0189084 A1 | 6/2016 | Galuten | | |
| 2017/0193619 A1* | 7/2017 | Rollins | ................. | G06Q 50/184 |

OTHER PUBLICATIONS

Pucci et al., "Measuring the relationship between marketing assets, intellectual capital and firm performance", Springer Science+Business Media, New York. (Year: 2013).*

* cited by examiner

SYSTEM AND METHOD FOR DETECTING, PROFILING AND BENCHMARKING INTELLECTUAL PROPERTY PROFESSIONAL PRACTICES AND THE LIABILITY RISKS ASSOCIATED THEREWITH

CROSS REFERENCE TO RELATED APPLICATIONS

The present application is a continuation application of U.S. patent application Ser. No. 15/594,558, filed May 12, 2017, the contents of which are herein incorporated by reference in their entirety.

BACKGROUND OF THE INVENTION

Field of the Invention

The present invention relates to data processing systems and methods specially adapted for administrative, financial, managerial, supervisory or forecasting purposes, and in particular to the area of Intellectual Property (IP) Management. The main embodiment of the invention relates to a computer-based method and a computer implemented system for detecting, profiling and benchmarking IP law professional liability risks and value associated with IP prosecution and maintenance process.

Description of the Related Art

IP instruments (patents, trademarks, trades secrets, industrial designs, copyrights) play an important role in our economy in encouraging private investment in the development of new technologies that improve productivity and quality of life for everyone. American innovators and businesses rely particularly on the legal rights associated with patents to reap the benefits of their innovations. Timely issuance of high-quality patents provides market certainty and allows businesses and innovators to make informed, timely decisions on product and service development. In 1993, the revenue generated from patents by U.S. companies was over $60 billion [Fred Warshofsky, *The Patent Wars*, John Wiley & Sons, Inc., New York, 1994]. Today, intellectual capital and intangible assets, including technology, brands and strategic competencies, comprise more than 50% of the business outputs in the U.S. economy.

Patents are further valuable because they collectively represent a vast technological database. According to Larry Kahaner's book, *Competitive Intelligence*, Simon & Schuster, 1996, "More than 75 percent of the information contained in U.S. patents is never released anywhere else." The number of patents applied for and issued to U.S. companies is increasing every year, especially in fast moving industries such as computer software, telecommunications, and biotechnology. Many international companies have also recognized the value of patents. In fact, foreign companies regularly rank among the leaders in issued U.S. patents.

Demand for patent examination is steadily rising: In 2008, the World Intellectual Property Organization (WIPO) estimated the number of patents in force around the world at 6.7 million, with an increasing share of inventions being patented in more than one country. Between 1991 and 2009, patent applications to the United States Patent and Trademark Office (USPTO) surged 171%, from 178,000 to 483,000. Similar situation is occurring across the globe, contributing to larger and larger backlogs at the world's patent offices.

Recent USPTO statistics show even further growth in patent demand. Since 2010, the USPTO is receiving more than 500,000 patent applications annually with 629,647 applications filed for the year 2015. The unexamined application backlog at the end of fiscal year 2016 (Sep. 30, 2016) stands at 537,655 cases, and the request for continued examination (RCE) backlog increased to 27,394 cases [USPTO Performance and Accountability Report for Fiscal Year 2016].

Intellectual Property is especially crucial to the economy of the United States. IP-intensive industries directly and indirectly supported 45.5 million jobs in 2014, nearly one-third of all U.S. employment. The share of total U.S. gross domestic product (GDP) attributable to IP-intensive industries increased from 34.8 percent in 2010 to 38.2 percent in 2014; In addition, the average weekly wage of $1,312 was 46 percent higher than the $896 average weekly wages in other than IP-intensive industries in the private sector [*Intellectual Property and the U.S. Economy:* 2016 *Update*, USPTO, U.S. Economics & Statistics Administration].

Intellectual property is also a big business in itself. With more than 600,000 applications filed and 300,000 patent rights granted each year, patent owners and applicants pay combined annual fees of nearly a billion dollars (about $6,700 per issued patent) to the USPTO to prosecute and maintain their patents and applications. This does not include the additional fees and costs expended for related professional services, such as attorneys fees and drafting charges. In addition, thousands of patent infringement suits are brought in the federal courts each year. A 1991 survey conducted by the American Intellectual Property Law Associations (AIPLA) reported that the median cost of patent litigation for each side through trial was about $650,000 [*Report of Economic Survey*, AIPLA, 1991]. More recent data, estimates the cost of patent enforcement litigation in the range of about $1 million per side. Therefore, the aggregate annual cost for obtaining, maintaining and enforcing patents in the United States is measured in billions of dollars.

The America Invents Act (AIA), which provisions are incorporated by reference herein, raises the stakes of quality of patent prosecution even higher with new laws enabling individuals and firms to challenge the validity of issued patents. These post-grant challenge options include: post-grant review, inter partes (or third party) review and "covered business method" patents review, which are handled by a panel of administrative judges, highly skilled in both technology and patent-law issues. In the new process, patents can be challenged on all grounds, including eligibility and clarity. The inter partes submission, allows any member of the public to submit documents and commentary for use by patent examiners giving them access to the most relevant documents when examining patent applications; the submission process has been greatly streamlined with no cost to the general public for the first three or fewer documents.

Because of great importance of patents in both the U.S. and global economies there has been continued interest in quantifying the intrinsic value of patents and their contribution to economic prosperity of the individuals or companies that hold or control them. Such information can be useful for a variety of purposes. For example, patent holders themselves may be interested in using such information to help guide their future decision-making or for purposes of tax treatment, transfer pricing or settlement of patent license disputes. Financial advisors and investors may seek to use such information for purposes of comparative value analysis or to construct measures of the "fundamental value" of publicly traded companies for purposes of evaluating possible strategic acquisitions or as a guide to investment. Economists may seek to use patent valuations for purposes of economic forecasting and planning. Insurance carriers may use such valuations to set insurance policy premiums and the like for insuring intangible assets. However, proper patent analysis, whether for purpose of licensing, infringement enforcement, freedom to operate, technical research, product development, and others is a very difficult, tedious, time consuming, and expensive task. Accordingly, detailed patent related analysis is usually not done, or it is done in an ad hoc, unorganized, incomplete, inefficient, or ineffective manner.

Patent Prosecution

Prosecution of a patent application is a complex process extending over many months and involving going through many stages. It starts with filing a formal patent application in a national patent office such as the USPTO and paying the application filing fee. To be valid, patent application must adhere to certain standards in accordance to USPTO rules and criteria typically comprising a specification and at least one claim. To define the scope of protection of the patent, the claims must point out and distinctly claim the subject matter of the invention. Some drawings are usually included in an application. They must show every feature of the invention specified in the claims and they need to conform to highly specific Patent Office requirements.

An examination phase consists of a series of negotiations between a Patent Office Examiner and the applicant (representative). Typically, the first Office Action rejects some or all of the claims providing grounds for each rejection. The applicant can try to overcome the rejections by amending the application or arguing why the objections are incorrect. The second Office Action, made after the Examiner considers the response and amendments submitted by the applicant, will typically end in an allowance or a final rejection of some or all of the claims. The Applicant can in turn adopt the changes as suggested by the Examiner, appeal the Examiner's decision, abandon the application if all of the claims have been rejected, or file a continuation application.

After all of the Examiner's objections are met and the application meets all other requirements, a Notice of Allowance is issued, specifying the issue and publication fees that must be paid prior to the patent being issued. Utility and reissue patents are issued within about four weeks after the required fees have been received by the Patent Office. A patent number and issue date will be assigned to an application and an Issue Notification will be mailed after the issue fee has been paid and processed by the USPTO. Patent Grant document is mailed on the patent's date of issuance.

Maintenance Fees

Maintenance fees for every U.S. granted patent are due at 3½, 7½, and 11½ years after the grant date and have to be paid on time in order to keep the patent from being abandoned. In the majority of foreign countries, fees are due annually even if the patent is still in the application phase. Payment of maintenance fees, in particular the foreign annuities, requires interaction between a docketing application, the law firm, the client, the annuity payment service firm, the foreign associate and the Foreign Patent Office. Due to the inefficiency of this process, clients must typically make decisions whether to pay the annuity fees to maintain the applications/patents in good standing four to six months prior to the actual due date.

In some cases patent assets are intentionally abandoned by their owners because they are perceived to have little or no remaining value, or keeping the assets in good standing is no longer economically sound. In other cases, the IP will lapse due to inattention, mistake, or professional negligence. Particularly troublesome are periods of change such as merger of businesses, an acquisition of a business, a divestiture of a business, or sale/purchase of a new patent asset. To assist patent owners, the USPTO Official Gazette publishes a prospective list of patent numbers which will require payment in an upcoming period. Patent owners can "revive" patents which have become abandoned due to lack of maintenance fee payments, however they must prove that the abandonment was unintentional or unavoidable and pay an extra petition fee. Furthermore, in some cases the petition must be filed within 2 years of the abandonment.

In cases of alleged professional negligence, the owner of an IP asset may seek to be compensated by the service provider, a law firm for example, that made a docketing mistake or failed to issue the correct instructions, proportionately to the value of the forfeited IP asset. This can include compensation for the cost, time and effort to attempt to revive the IP asset or the asset's value itself, if it cannot be revived. Even if the revival is successful, the owner may seek compensation for "diminished value" of the asset due to "intervening rights" of a third party.

IP Attorneys and Patent Agents

Filing a patent application does not automatically guarantee receiving patent rights. Latest research suggests that, based on prosecution histories of 2.15 million U.S. patent applications from 1996 to mid-2013, only 55.8% of the applications emerged as patents without using continuation procedures to create related applications. The allowance rate has decreased substantially over time, particularly for applications in the "Drugs and Medical Instruments" and "Computers and Communications" fields. Furthermore, applications filed by small firms were less likely to emerge as patents than those filed by large firms. [*What is the Probability of Receiving a U.S. Patent?*, Michael Carley, Deepak Hegde, and Alan Marco, 17 YALE J. L. & TECH. 203, 2015].

There are many reasons for the above statistics including complexity of the patenting process itself. Filing and prosecuting patent application in any national Patent Office is an undertaking requiring substantial knowledge of IP laws and Office practices and procedures, as well as considerable knowledge of the scientific or technical matters involved in the particular invention. While patent rights may be obtained in many cases by persons not skilled in those areas, there is no assurance that the obtained patent would adequately protect the particular invention.

Most inventors employ the services of registered patent attorneys or patent agents. The USPTO maintains a register of attorneys and agents permitted by law to represent inventors before the USPTO. To be admitted, an applicant must possess the legal, scientific, and technical qualifications necessary to render a valuable service and pass strict examination process, which requires a college degree in engineering or physical science or the equivalent of such a degree. The USPTO registers both attorneys at law and persons who are not attorneys at law. The former persons are referred to as "patent attorneys," and the latter persons are referred to as "patent agents."

The USPTO cannot recommend or aid in the selection of any particular attorney or agent or respond to any inquiries about "reliability" or "professional capability" of any patent attorney, agent, or firm listed on the USPTO register. The fees charged to inventors by patent attorneys and agents for their professional services are also not subject to regulation by the USPTO. Definite evidence of overcharging may theoretically form a base for some USPTO action, but in reality, the Office rarely intervenes in disputes concerning fees. The USPTO will however act upon complaints against attorneys and agents guilty of gross misconduct or lack of professional qualifications with the power to disbar or suspend them from practicing in their jurisdiction.

Professional Liability Risks

The procurement of patent rights is one of the most challenging IP processes in view of the complex and ever changing IP laws and Patent Office governing practices. This holds especially true in case of patent applications filed under the PCT and entering National/Regional stage of prosecution in multiple National Patent Offices. In such case, Applicants are faced with a landscape of national-based variations in formal or procedural requirements. There is no centralized database providing easy access to deadline correspondence, such as Office Actions for all the regional or national jurisdictions. In some cases, due to missed deadlines or formal requirements, mistakes can lead to irrevocable loss of patent rights. Even the effort necessary to maintain up-to-date forms and keep up with ever changing procedures can be very taxing, particularly for smaller IP firms, independent IP professionals, and foreign associates.

As with patents, trademarks are also subject to examination, missed deadlines, incorrect or invalid priority claims or incomplete applications and risk events that could potentially affect the liability of IP firms and IP professionals and the rights of their owners.

The trademark prosecution process is government sanctioned and each application undergoes rigorous examination by the relevant National IP Office. Trademark application filed by way of national application involves sending of instructions between counsel in two different jurisdictions. The process of documenting and filing a national trademark applications will usually be based on a prior corresponding foreign application or registration. This process of obtaining and inputting the information from one national filing system into another is human managed, manual, and error prone.

The inability of users and trademark owners to detect filing mistakes, some of which are time sensitive and not correctable after a deadline, highlights the risk associated with correctly inputting foreign-based information. By the same token, the trademark examination process displays characteristics of event risk such as an attorney having missed a deadline and unsuccessfully seeking to revive an abandoned application after the abandonment period has expired or the difficult to explain high ratio of abandonments for failure to respond to notice of approval.

There is a significant shortage of IP specialists in view of the demand that has greatly increased the costs of hiring IP professionals. In addition, the average time required to prepare and file an application is longer than ever due to the increased workloads on the agents and attorneys. To reduce delays, certain patent professionals have culled their client base to focus exclusively on serving large or well-funded corporate clients or to specialize in narrow areas of technology. Others, try to cope with the increase workload by drastically shortening prior art searches, cutting the time for specification drafting, or allotting less time to properly match the scope of claims to the invention. Moreover, since every application is unique, there is a learning curve to it, and the process can become lengthy, expensive, and prone to errors.

Historically, cases of professional negligence, errors or omissions regarding IP work have been rather difficult if not impossible to track due to the complex nature of patent prosecution and limited access to Patent Office records. Furthermore, the USPTO does not provide statistical data for cases of incomplete applications or documents not adhering to the USPTO standards and requirements.

The situation changed dramatically since 2011 with introduction of the Patent Application Information Retrieval (PAIR) system that can be accessed over Internet-based portal via Public or Private PAIR channels. Through the former, public can check current status of issued or published patent applications and obtain image file wrappers (file histories) of published applications including direct access to prosecution documents. Private PAIR allows registered users to access status of their unpublished patent application and to track progress of the prosecution process.

The PAIR system has been in operation for several years but still has some limitations. Knowledge of a specific case number is required for example to access data and the output results are not easy to review. There are access limiting mechanisms put in place by the USPTO, including CAPTCHA test and timeout limits, to prevent machine access and limit the amount of traffic.

PAIR data is grouped and accessible via multiple tabs, including Application Data, Transaction History, Image File Wrapper, Foreign Priority, Published Documents, Address & Attorney/Agent, Supplemental Content, and Assignments. While the tabs are reasonably well organized, the site is difficult to navigate within a conventional browser because many of the conventional function buttons do not operate in a consistent manner, resulting in resubmitting the query all over again. In addition, the system frequently times out and forces the user to go through the CAPTCHA test again, which is both frustrating and time consuming.

Notwithstanding PAIR limitations, the system allows for a remote access and downloading of a broad range of accessible IP prosecution data that could be used for variety of applications, including a qualitative analysis and benchmarking of professional IP practices and liability risks associated therewith that is the purpose of the present invention.

At present, the industry for ranking intellectual property professionals and law firms is scattered with multiple players and disparate methodologies for ranking the performance and quality of the work done. Some of the website-based rankings of general law and IP law firms can be accessed via the following links: www.managingip.com, www.IPStars.com, www.IAM-media.com, www.IPwatchdog, www.Juristat.com, www.ificlaims.com, www.vault.com, www.legal500.com, www.bestlawfirms.com, www.lexpert.ca, to name just a few. Most of these sites focuses on the U.S. market but some include international IP rankings for selective multiple IP jurisdictions as well.

Such performance rankings of intellectual property law providers are usually based on a subjective survey of peers or clients and reputation of those clients, number of applications filed, portfolio size, the extend of time to take an application from filing to issuance, number of claims approved and/or number of office actions processed.

Purchasers of intellectual property law services, financiers, potential employers and others use these rankings as factors to make decisions on whether or not to invite, consider, or retain a particular service provider. In turn, providers of these services rely on these rankings as proof of their competence and reliability. However, empirically, these rankings have a limited scope and reliability.

First, there is no objective validation of the results of existing rankings. Second, they fail to address in particular the unique behavioral profile of each firm. Third, none of the rankings rely exclusively on an empirical methods and systems. Fourth, there is no method or system for IP law providers that utilizes independent benchmarks to assess the quality of their work against that of their peers and competitors.

Professional Insurance Liability Risks

The assessment of and the decision to provide professional liability insurance coverage of intellectual property law firms has been dependent up to now on law firms' voluntary disclosure of their past risk to their insurers, the types of risk management practices they employ, the systems and people in place to manage those risks, and their continuing voluntary obligation to disclose any risk that may affect their insurance coverage.

To assess risks involved with a particular law firm policyholder, the insurance industry usually relies on infrastructure requirements as described above and the claims history profile, if any. While insurers and brokers have access to past claims data as a basis to assess and predict risk, the tools to assess these risks are subjective and limited.

First, insurers and brokers have access to reported data belonging only to their clients; There is no publicly accessible empirical practice profile to the IP industry. Second the data available to the insurance industry is limited to claims data and mostly claims driven. There is no system to access and determine behavioral activities of current and potential policyholders. Third, aside from the generally acceptable insurance risk principles, the IP professional liability insurance industry and each insurer relies only on subjective criteria.

There is currently no method or system to determine and assess empirical behavioral non-claims based data, including reportable incidents of policyholder professional activities before a patent and trademark office, without having to continuously ask and inspect a policyholder's file.

The lack of objective assessment of a law firm's empirical behavioral non-claims based data and reportable incidents of professional activities exposes a significant black hole in the risk assessment of a current and potential policyholder. This black hole in turn affects the ability of insurers and brokers to reliably review the current, and properly predict the future risk behavior of a policyholder. In turn this black hole also reduces the ability for proper assessment of a risk profile of a client and reduces the potential for a better price premium.

There are several prior art publications disclosing system and methods for accessing the PAIR system data for a variety of applications, including analyzing the prosecution documents, however all of them focus on quantitative analysis of the data rather than on qualitative assessment indicative of a professional liability risks associated with IP prosecution and maintenance.

The U.S. Pat. No. 9,305,278 "System and Method for Compiling Intellectual Property Asset Data", incorporated by reference herein, describes a method for operating an access computing system for retrieval of data from a target organization database with limited or challenging access via different and improved interface. It further provides for a system indirectly analyzing and predicting behavior of a target organization, including profiling and characterizing the behavior of art units and/or specific personnel, which is an IPO, across an entire set of documents. Therefore, the focus of the above method and system is on obtaining the data and profiling an IPO rather than performance of IP professionals and IP law firms.

The U.S. Pat. No. 9,183,278 "Computerized Information System for Creating Patent Data Summaries and Method Therefor," incorporated by reference herein, describes a method and a computer system for generating comprehensive patent data summary reports on a target entity based on searching and identifying all publicly available patent records associated with that entity. In one of the embodiments, the above system determines number of issued patents for each patent attorney associated with a business entity and ranks them by number of patents associated with the business entity. However, there is no intention of ranking law firms or patent attorneys based on the quality of their work and applying such data to a professional liability risk analysis, scoring their work, risk benchmarking and underwriting liability insurance policy making.

The U.S. published patent application No. 2015/0348217 "Patent Rating", incorporated by reference herein, proposes a system and method for assigning a rating to a patent owned by a business entity based on a selected aggregated metric modeled on patent prosecution data. The system is clearly meant to rate patent documents rather than performance of patent professionals or to help underwriters and insurance companies ask underwriting risk.

The U.S. published patent application No. 2016/0189084 "System and Method for Determining the Value of Participants in an Ecosystem to One Another and to Others Based on Their Reputation and Performance", incorporated by reference herein, describes system and method for rating participants in an ecosystem based on their past performance and reputation index based on feedback from other participants in the system. However, the described method and system applies towards media industries (video, film, TV) rather than insurance and IP laws and practice with no provisions at all for rating IP-related professional liability risks.

Therefore, in light of the limitations and disadvantages of the prior art, the present invention addresses the need for a comprehensive method and a system for analyzing the historical and real time IP prosecution and administrative data to access a professional liability risks of an IP business entity, including law firms and IP professionals, inclusive of scoring and ranking those entities against empirically calculated benchmarks. There is also need to assess further the professional liability insurance risk profile of those entities, which would be useful to commercial insurance carriers for setting insurance policy premiums and mitigating their risks associated with liability coverage policies of their actual and potential clients.

SUMMARY OF THE INVENTION

The present invention is directed to the Patent Practice Benchmark (PPB) computer-implemented method and the PPB computer-based system for detecting, profiling and benchmarking IP law professional liability risks and professional liability insurance risks and value associated with IP prosecution and maintenance process of an IP Target Entity, including IP law firms and independent IP professionals. The invention allows further an insurance firm to accurately quantify professional liability risk of a new or existing client (Target Entity) and to mitigate such risks. The invention allows further any party, including business entities, non-profit entities, universities, R&D Institutes, commercial clients, vendors, marketers, etc. (Client User) to obtain a patent practice score of any patent law firm. PPB accesses and collects transaction data indicative of risk-reducing and risk-increasing behavior of an IP Target Entity from a National/Regional IP Office (IPO) in a chosen jurisdiction and sends the transaction data (Asset Data) to a back-end system for processing and analysis.

In the preferred embodiment of the invention, the IPO is the USPTO and one of the transaction data sources is the PAIR system hosted by the USPTO.

Forming one aspect of the invention is the PPB computer-based system apparatus capable of obtaining and analyzing information downloaded from the IPO to determine whether the information is indicative of IP law professional liability risk-reducing or risk-increasing behavior.

Forming another aspect of the invention is the PPB computer-implemented method for analysis of the information whereby, the back-end system determines whether the received information is indicative of a risk-reducing or risk-increasing behavior based on a threshold factor (benchmark) established during the process.

According to another aspect of the invention, the PPB computer based system apparatus can be coupled to another computing device, which provides real time data about the risk-reducing or risk-increasing activity of an insured entity before any IPO.

According to another aspect of the invention, the device can record any periods in which the insured entity has any risk-reducing or risk-increasing behavior before the IPO.

Another aspect of the invention is that upon confirmation that the information indicates risk-reducing or risk-increasing behavior, the back-end system may perform one or more actions defined by a set of rules to establish a trigger alert to the insurer, broker or the insured entity for a response action corresponding to the behavior.

Additional advantages and/or features of the present invention will be set forth in the following detailed description. It is to be understood that both the foregoing general description and the following detailed description of the present invention are exemplary and explanatory and should be treated broadly as to not limit the scope of the invention as claimed.

BRIEF DESCRIPTION OF THE DRAWINGS

Embodiments of the present disclosure will now be described, by way of example only, with reference to the attached figures.

DETAILED DESCRIPTION

Figure 1:
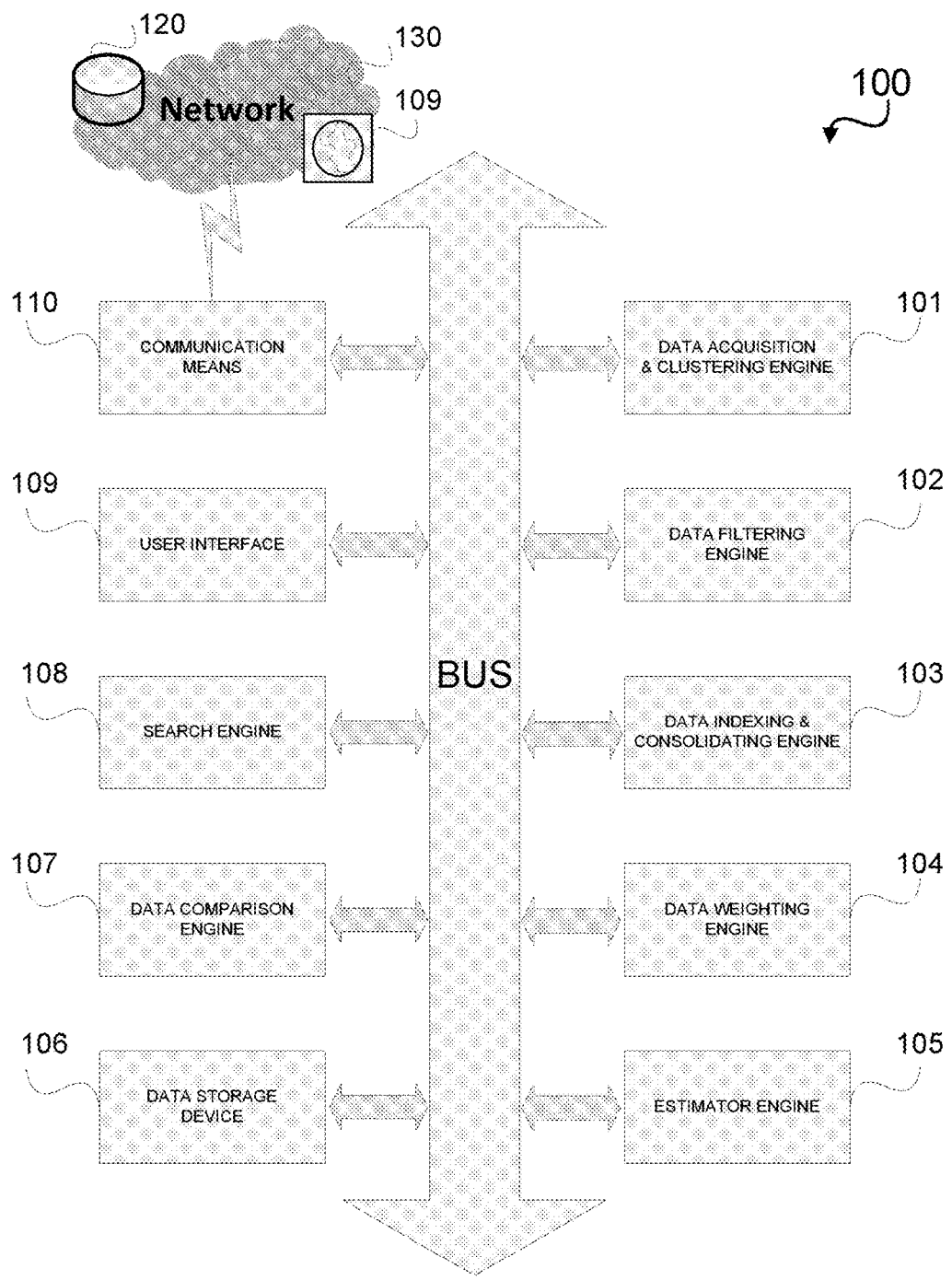
FIG. 1 is a is a block diagram of the PPB computer-based system, according to an exemplary embodiment of the present invention.

The presently disclosed embodiments of this invention are directed to a computer-implemented method and computer-based system for detecting, profiling and benchmarking IP professional practices and the liability risks associated therewith.

It is to be understood that both the foregoing and the following detail description are exemplary and explanatory only and are not intended to limit the claimed invention in any manner whatsoever. Throughout much of the description, reference is made to patents and deadlines applicable to patent prosecution. However, it should be understood that the present application is also applicable to other forms of IP, such as trademarks, industrial designs, copyrights, etc. and to all types of deadlines, not just reply deadlines to refusals.

As used herein, the term "intellectual property" or "IP" relates to the various forms of intellectual property, including patents, trademarks, trade secrets, industrial designs, copyrights, trade dress, plant breeders' rights, but in particular to patents and trademarks. It is intended that the term should have a broad definition including technology embodying the IP (e.g. hardware, software, computer programs and systems, training methods, methods of doing business), as well as the know-how and methods for using the IP.

As used herein, the term "National/Regional IP Office" or "IPO" refers to a governmental or intergovernmental organization that controls the process of issuing or registering intellectual property, such as patents and trademarks. Examples of IP Offices include the United States Patent and Trademark Office (USPTO), the Canadian Intellection Property Office (CIPO), World Intellectual Property Organization (WIPO), European Intellectual Property Office (EUIPO), European Patent Office (EPO), Office for Harmonization in the Internal Market (OHIM), United Kingdom IP Office (UKIPO), Japan Patent Office (JPO), and others.

As used herein, the terms "agent," "patent agent," "patent attorney," "patent practitioner" refer to a person authorized to act before one or more IP Offices in respect to IP matters. The persons might perform IP-related professional work in their own capacity or as an employees of IP law firm or other entities that are authorized to act before the respective IPOs.

As used herein, the term "target entity" refers to a natural person and/or corporate entity (business person) engaged professionally in any IP-related work, including IP law firm and IP professionals employed by the law firm, in-house IP departments, corporate IP counselors, self-employed IP attorneys, agents, professionals and such.

As used herein, the term "general client" may include any individual, consumer, consumer group, business entity, organization, government entity, transaction account issuer or processor (e.g. credit or financial institution, etc.), merchant, consortium of merchants, consumer, account holder, charitable organization, and/or any other similar entity.

As used herein, the term "liability risk profile of a target entity" means a profile based on any historic and recent professional activities related to IP portfolio asset prosecution, litigation or management, including events of professional practice errors, omissions, events of incompleteness or mismanagement, associated with the target entity including professional employees of the target entity.

As used herein, the term "liability insurance risk profile of a target entity" means a risk assessment profile allowing insurance companies offering professional liability insurance coverage with respect to a target, agent and/or its professional employees to assess insurance risks, determine the amount of coverage needed, as well as how much that coverage should cost and manage their exposure and mitigate potential claims associated with a target entity including its professional employees for both current and potential new clients. Such a risk profile provides visibility based on historical data into a current or prospective client's ability to handle past and future IP related transactions thereby enabling insurance companies to quantify a target's organization's exposure and risks.

As used herein, the term "liability trigger events" means any historic and recent professional activities related to IP portfolio asset prosecution, litigation or management, including events of professional practice errors, omissions, events of incompleteness or mismanagement, associated with the target entity including its professional employees, that are susceptible to effect the liability risk profile and the liability insurance risk profile of a target entity.

As used herein, the term "Asset Data" refers to any data related to IP prosecution, litigation, and administration including historic and real time IP prosecution transaction data, IP administrative data, maintenance fees data, reexamination and reissue data, litigation and appeals data, assignments data, and in particular USPTO PAIR Transaction History data.

As used herein, the term "Liability Alert Data" means Asset Data profiled for risk event/action codes associated with one or more of liability trigger events.

As used herein, the term "predetermined factors" means a set of liability trigger events that are considered to be indicators of a risk.

As used herein, the term "Weighted Liability Alert Data" means Liability Alert Data associated with predetermined factors associated with the seriousness of a "liability trigger event".

As used herein, the term "predictive models" means a process of data mining combined with probability analysis to forecast outcomes of an IP process or event.

As used herein, the term "Subject Matter Professional Conflict of Interest" or "Conflict of Interest" or "Conflict" means situations where there is concurrent patent representation by the same practitioner for different applicants or patent holders in the same area of technology.

As used herein, the term "IP classes" or "classes" means classes and subclasses as cited on the published patent application/grant documents according to the Cooperative Patent Classification System (CPP), the United States Patent Classification System (USPC), and the International Patent Classification system (IPC), including the Field of Classification Search classes and subclasses.

As used herein, the term "liability risk score" or "risk score" means the likelihood or calculated probability that a "target entity" will face or be the cause of an error that would result in a professional liability claim.

As used herein, the term "liability insurance risk score" or "insurance risk score" means the score that is used to assess factors as to whether an entity should be subject of insurance coverage or term thereof.

As used herein, the term "IP document" or "IP case" refers to any IP application or IP grant. Examples include patent and trademark applications, granted/issued patents and trademarks, and others.

As used herein, the term "Master Patent Practitioner Roster" or "MPPR" means for instance USPTO Patent Practitioner Roster List of agents and attorneys registered to practice with the USPTO or the equivalent IPO body compared with a list of agents and attorneys found on all applications and grants before the IPO indexed by location and size.

As used herein, the term "Master Law Firm Roster" or "MLFR" means a roster of all IP law firms listed with agents and attorneys in the Master Patent Practitioner Roster" or "MPPR.

As used herein, the terms "MPPR-Loc" and MLFR-Loc" mean MPPR and MLFR tables indexed for the number of geographical single/multi office locations.

As used herein, the term MLFR-Size" means MLFR table indexed for the number of IP professionals employed by a roster of law firms and sorted by the law firm.

As used herein, the term "PP/LF Assets" means a consolidated table of all IP law firms associated with their IP professional employees and with their active IP portfolio cases (patent applications/grants).

As used herein, the term "Market Portfolio and TH Risk Events Table" or "MP&TH RET" means the "PP/LF-Assets" data consolidated with the Transaction History risk event/action codes sorted by year.

As used herein, the term "Market Portfolio and MF Risk Events Table" or "MP&MF RET" means the "PP/LF-Assets" data consolidated with the Maintenance Fees event/action codes sorted by year.

As used herein, the term "Market Portfolio and CI Risk Events Table" or "MP&CI RET" means the PP/LF-Assets data consolidated with the Subject Matter Professional Conflict of Interest risk event counts sorted by year.

As used herein, the term "TH score" or "THS" means a score calculated on an annual bases by the PPB method to reflect the risk liability of a target entity (IP law firm or patent practitioner) based solely on its portfolio Transaction History risk event/action codes.

As used herein, the term "TH Score Average" or "THSA" means the average of the TH score (THS).

As used herein, the term "TH Benchmark" or "THB" means the standard against which the overall market is measured against based on the Transaction History risk event/action codes alone.

As used herein, the term "TH Benchmark Average" or "THBA" means the average score of the TH benchmark (THB).

As used herein, the term "MF Score" or "MFS" means a score calculated on annual bases by the PPB method to reflect the risk liability of a target entity (IP law firm or patent practitioner) based solely on its portfolio Maintenance Fee Event codes.

As used herein, the term "MF Score Average" or "MFSA" means the average of the MF Score (MFS).

As used herein, the term "MF Benchmark" or "MFB" means the standard against which the overall market is measured against based on the Maintenance Fee Event codes alone.

As used herein, the term "MF Average Benchmark" or "MFAB" means the average of the MF benchmark (MFB).

As used herein, the term "CI Score" or "CIS" means a score calculated on annual bases by the PPB method to reflect the Subject Matter Professional Conflict of Interest (CI) risk liability of a target entity (IP Law Firm or Patent Practitioner) based solely on its portfolio counts of Potential Conflict Events.

As used herein, the term "CI Score Average" or "CISA" means the average of the CI score (CIS).

As used herein, the term "CI Benchmark" or "CIB" means the standard against which the overall market is measured against and based on the CI risk event counts alone.

As used herein, the term "CI Benchmark Average" or "CIBA" means the average of the CI benchmark (CIB).

As used herein, the term "Combined Risk Profile Table" or "CRPT" means TH, MF, and CI risk events table consolidated with patent practitioner/law firm portfolios sorted by years and indexed by a variety of risk factors.

As used herein, the term "GIC Risk Table" or "GICRT" means a tabulation of risk events pre-sorted by BIC Bloomberg business codes denoting areas of business.

As used herein, the term "Overall Market Score" or "OMS" means the combined risk events of the entire market of IP practice events.

As used herein, the terms "Overall Market Average" or "OMA" means the average of the Overall Market Score divided by the total number of IP law firms.

As used herein, the term "Patent Practice Benchmark" or "PPB" means a group of law firms whose risk scores are consistently above the Overall Market Score (OMS) and Overall Market Average OMA).

A detailed overview of the PPB computer-based system and method of the present invention will now be described with reference to FIG. 1 to FIG. 10.

For the sake of brevity, conventional data networking, application development and other functional aspects of the PPB systems, including individual operating components of the system, may not be described in full detail herein. Furthermore, the connecting lines shown in the various figures contained herein are intended to represent exemplary functional relationships between the various elements. Many other or additional functional relationships or physical connections may be present in a practical implementation of the PPB system.

While the description references specific technologies, hardware, equipment, system architectures and data management techniques, practitioners will appreciate that this is just one potential embodiment of the PPB system and method and that other devices and/or processes may be implemented without departing from the scope of the invention. Similarly, while the description may reference a user interfacing with the system via a personal computer, other interfaces may include mobile devices and handheld devices such as personal digital assistants.

Figure 10:
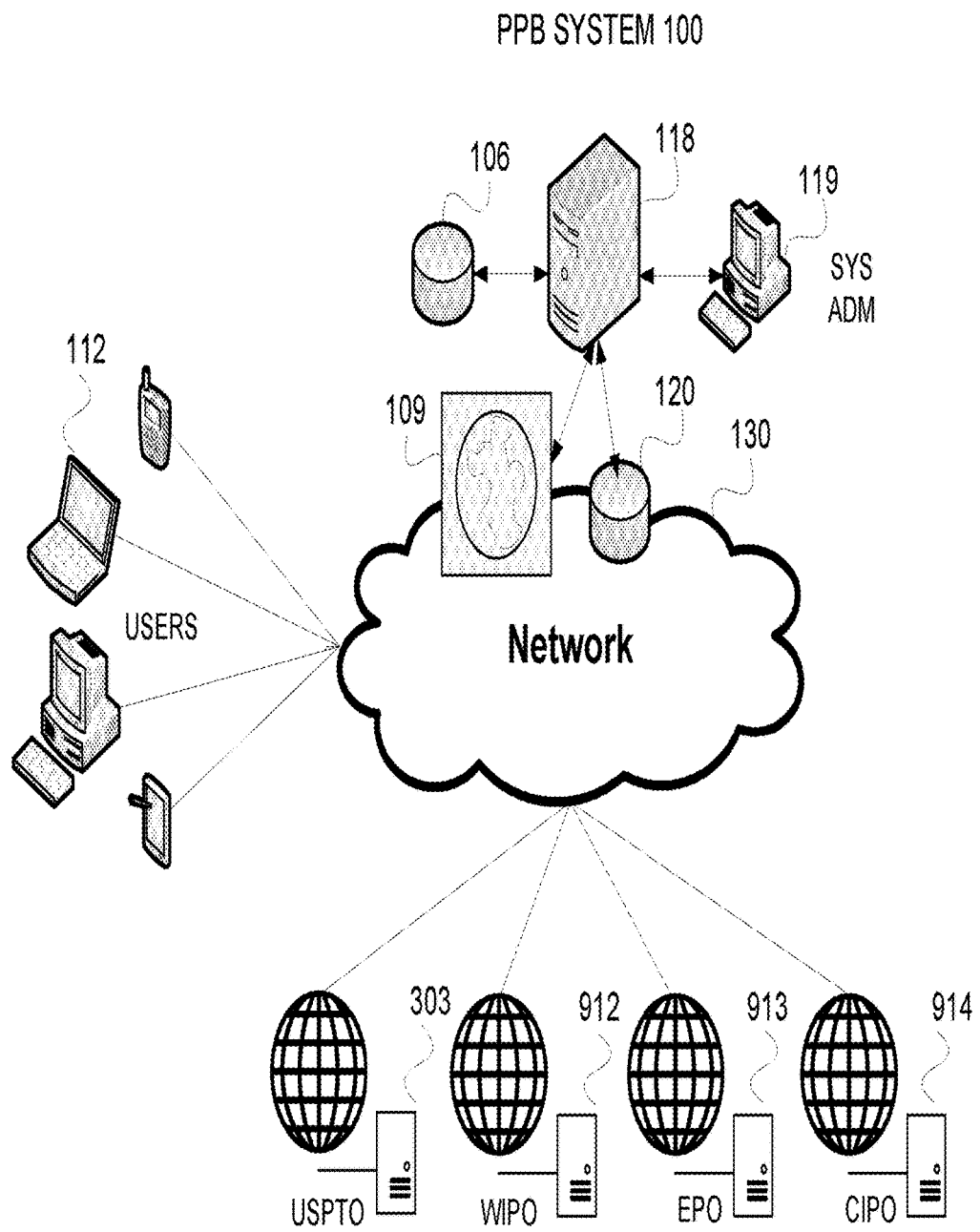
FIG. 10 is a schematic view of a network environment within which the PPB computer-based system operates, according to an exemplary embodiment of the present invention.

An exemplary embodiment of the present invention is now described with reference to FIG. 10, which shows a network environment within which the PPB computer-based system 100 and PPB method 200 operates. There is the PPB computer-based system 100 connected to the Network 130 and including a Host Server 118, mass data storage device (DSD) 106, a user interface 109, a System Administrator Terminal 119, and a cloud-bases data storage 120. The logical units of PPB System 100 may reside on a single Host Server 118 or be implemented across multiple servers (e.g. web server, file server, database management server) cooperating with each other by way of a pooled, distributed, or redundant computing model.

In alternative embodiments, the Host Server 118 operates as a standalone device or may be connected (e.g., networked) to other computer devices. In a networked deployment, the Host Server 118 may operate in the capacity of a server or a client device in server-client network environment, or as a peer device in a peer-to-peer (or distributed) network environment. The Host Server 118 may be a personal computer (PC), a tablet PC, a set-top box (STB), a Personal Digital Assistant (PDA), or any other device capable of executing instructions (sequential or otherwise) that specify actions to be taken by that device. Further, while only a single Host Server 118 is illustrated, the term "device" shall also be taken to include any collection of devices that individually or jointly execute a set (or multiple sets) of instructions to perform any one or more of the methodologies discussed herein.

The User Interface 109 allows one or more users to access the PPB System 100 via User Terminals 112 upon creating an account and log in. User Terminals 112 may be a personal computer, a mobile device, or any other communication or computing device capable of communicating and accessing the User Interface 109 via a Network 130. The User Interface 109 may be hosted on a Web Server (e.g. Microsoft Azure) and implemented using a variety of programming languages or programming methods, such as HTML (HyperText Markup Language), VBScript (Visual Basic® Scripting Edition), JavaScript™, XML® (Extensible Markup Language), XSLT™ (Extensible Stylesheet Language Transformations), AJAX (Asynchronous JavaScript and XML), Java™, JFC (Java™ Foundation Classes), and Swing (an Application Programming Interface for Java™). The PPB System 100 can be also accessed by a System Administrator 119 via the same User Interface 109 with an administrator level log in or directly on a local level.

Network 130 may include local-area networks (LAN), wide-area networks (WAN), combinations of LAN's or WAN's, such as the Internet which is the preferred option for this invention, wireless networks (e.g., 802.11 or cellular network), the Public Switched Telephone Network (PSTN) network, personal area networks (e.g., Bluetooth) or other combinations or permutations of network protocols and network types. Devices and systems of the User Terminal 112 may be coupled to Network 130 via one or more wired or wireless connections.

The PPB System 100 has access via Network 130 to at least one National/Regional IP Office (IPO) System hosting IP-related data and information related to IP prosecution and administration in that particular IPO jurisdiction (e.g. patent or trademarks applications, issued patent grants, registered trademarks). Some of the IPOs targeted by the PPB System 100 might include the USPTO 303, WIPO 912, EPO 913, and CIPO 914 as shown in FIG. 10. It is presumed that each of the IPOs is connected to the Network and accessible to the PPB System 100 via an E-access Interface hosted by the IPOs (not shown in detail here). The E-access Interface allows the PPB System 100 to access and download IP-related data (Asset Data) from the IPO systems.

FIG. 1 shows the logical components of the exemplary PPB computer-based system 100 comprising Data Acquisition & Clustering Engine 101, Data Filtering Engine 102, Data Indexing & Consolidating Engine 103, Data Weighting Engine 104, Estimator Engine 105, Local Data Storage Device (DSD-Local) 106, Data Comparison Engine 107, Search Engine 108, User interface 109, Communication Means 110, and Cloud Data Storage Device (DSD-Cloud) 120.

The Data Acquisition & Clustering Engine 101 uses Communication Means 110 to access, obtain, and download IP-related data (Asset Data) from an IPO System of choice 912-915. The downloaded Asset Data can be stored on a local data storage devices (DSD) 106 or in a cloud. The Data Filtering Engine 102 filters and profiles the downloaded Asset Data checking for risk event/action codes associated with one or more liability trigger events and by other factors as required by the PPB method 200. The Data Indexing & Consolidating Engine 103 is used for indexing and consolidating Law Firms with their IP practitioner employees, with their IP portfolios, and with a variety of consolidated risk tables as required by the PPB method 200.

The Data Weighting Engine 104 applies one or more predetermined factors associated with the liability trigger events to the Risk Alert Data to produce Weighted Risk Alert Data, which is stored to the local mass storage device 106. The Estimator Engine 105 uses one or more processors to determine a variety of factors associated with a pre-selected law firm, including the number of professional employees on staff, the number of IP transaction conducted, and the dollar amount of filing fees paid by in a pre-determined period of time.

The Comparison Engine 107 uses one or more processors to determine liability risk profile of a pre-selected law firm by applying one or more predictive models trained on the Asset Data to the Weighted Risk Alert Data calculating a variety of risk factors including risk score, risk rankings, and benchmarks to be outputted to the local DSD 106, to a User Interface 109, and to range of display devices. Those risks include but are not limited to risks related to Transaction History Data (THD), Maintenance Fee Events Data (MFD), and Professional Subject Matter Conflict of Interest Data (CID).

The Search Engine 108 is used to respond to a user request for risk profiles of a pre-selected law firm inputted via the User Interface 109 and for other information as allowed by the user log in privileges. The User interface 109 allows the users to access the PPB System 100 and input their requests for risk profile of pre-selected law firm or for other information as allowed by the user log in privileges. The Communication Means 110 allow the PPB System 100 to communicate with the IPOs via the Network 130 and with the users via the User Interface 109. The Local Data Storage Device (DSD-Local) 106 is used to store the downloaded Asset Data as well as all intermediary and final results of the PPB method 200. The cloud-based Data Storage Device (DSD-Cloud) 120 is used as a mirror backup for all of the local databases and to facilitate and speed up delivery of some of the PPB method 200 results to the users. The DSD-Cloud 120 may be hosted on proprietary Web Server or a shared cloud-based server space rented from Microsoft Azure, as an example.

The following description relates now to the PPB computer-implemented method 200 for detecting, profiling and benchmarking intellectual property (IP) trigger events indicative of performance quality and subject matter conflict of interest of IP professional practices and susceptible to affect liability risk profile and professional liability risk profile of a target entity, including IP professionals employed or representing the target entity.

The PPB method 200 calls for accessing and downloading an IP-related data (Asset Data) from an IPO system to a local databases, filtering the downloaded data by checking for codes associated with liability trigger events to produce Liability Alert Data (LAD), weighting the LAD with predetermined weights indicative of a seriousness of a given code to produce a Weighted Liability Alert Data (WLAD), and cross-checking WLAD against combined patent practitioners/law firm portfolios to determine the liability risk profile and the liability insurance risk profile of a patent practitioner or a law firm on an annual bases. Upon user's request, the pre-calculated markers of the liability risk profiles (risk score, risk ranking, industry benchmark) for a pre-selected patent practitioner or a law firm could be displayed on user's device of choice via the User Interface 109.

At consecutive stages of the PPB method 200, various sets of data are processed, filtered, consolidated and stored in their respective databases or tables that are often compared against each other. For example, data stored in a first database may be associated with data in a second database through the use of common data fields. In various embodiments, a given field data may be associated with more than one portfolio by creating multiple entries in the portfolio database, one for each portfolio the data field is associated with. In other embodiments, one or more patent reference documents may be associated with a patent by creating multiple entries in the patent's database.

The databases may be composed of one or more logical or physical databases. Operations database, holding computer executable statements and instructions, may be implemented as a relational database, a centralized database, a distributed database, an object oriented database, or a flat database in various embodiments. The structure, format and titles of the databases used in this description are for illustration purposes only and other structures, names, and formats may be used as required by other embodiments of the invention. Additionally, further associations between data stored in the databases may be created as discussed further herein.

The description set forth will be directed now to an exemplary embodiment of the PPB method 200 directed to the USPTO and to patent prosecution only. A person skilled in the art pertaining to this invention will appreciate the fact that the same system and method may be used in relation to any other National or Regional IPO for scoring and benchmarking IP practitioners and law firms practicing under their jurisdiction and to prosecution of any other IP assets (trademarks, industrial designs, etc.) as long as the transaction history data is available for public access. The sources of the IP data and their formats might be different but the overall approach would remain the same or highly similar and the intended risk factors (risk score, risk ranking, patent practice benchmark) will apply to all IP practitioners and IP law firms regardless of the jurisdiction of their practice.

Figure 2:
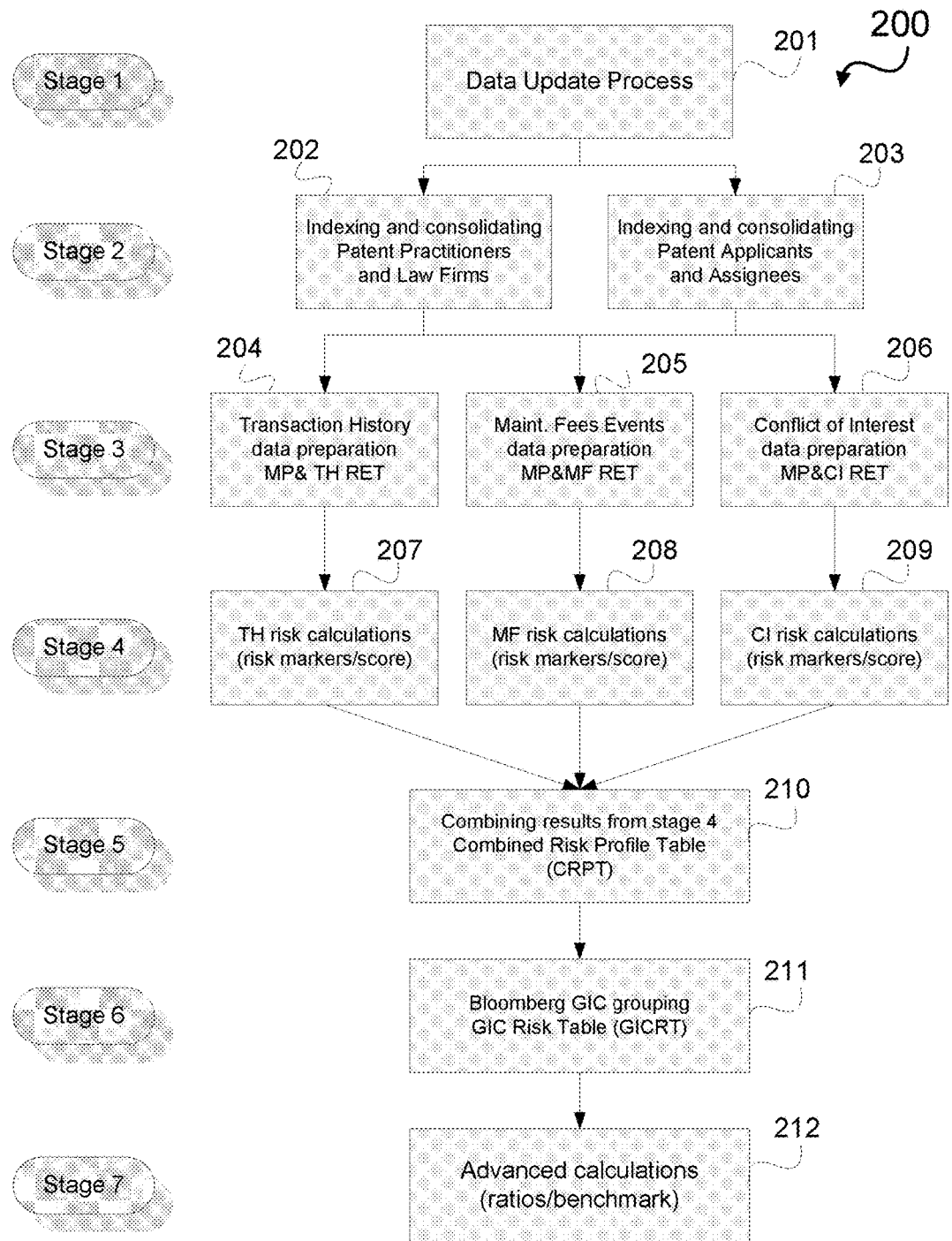
FIG. 2 is an overview of the PPB method, according to an exemplary embodiment of the present invention.

FIG. 2 is an overview of the PPB method 200 divided into 7 stages and 12 different sets of processes 201-212, just for the ease of understanding the method. It should be noted however, that the various processes of the method are interconnected and various logical units may access and perform parts of the described processes in a non-exclusive manner.

Stage 1 of the PPB method 200 involves Data Update Process 201 involving weekly Asset Data updates to be processed the further in the following stages of the PPB method 200. The Asset Data is available from the USPTO sites such as the Bulk Data Storage System (BDDS), Pair Bulk Data Interface (PBD), or PAIR-Public either as annual back files or regular updates. The updates are downloaded to their respective databases stored on the local DSD 106 after going through some formatting and clustering processes.

Process 209 of Stage 2 of the PPB method 200 involve Indexing law firms and patent practitioners and their IP portfolios and consolidating all the data in one combined PP/LF-Assets Table 406. Process 203 of Stage 2 indicate possibility of indexing and consolidating Patent Applicants and Assignees with their IP portfolio in a future embodiment of the invention.

Stage 3 of the PPB method 200 involves data preparation for further processing split into three data streams: Transaction History (TH) data preparation 204, Maintenance Fee Events (MF) data preparation 205, and Professional Subject Matter Conflict of Interest (CI) data preparation 216 resulting in three Market Portfolio & Risk Events Tables for each stream of data: MP&TH RET 507, MP&MF RET 515, and MP&CI RET 520.

Stage 4 of the PPB method 200 involves risk calculation process split into three data streams: TH data processing 207, MF data processing 208, and Professional Subject Matter Conflict of Interest (CI) data preparation 209 resulting in three Risk Tables for each stream of data: THRT 603, MFRT 609, and CIRT 615. The end results of stage 4 includes also three risk factor tables (risk score, average risk score, benchmark, benchmark average) for each stream of data: TH risk markers 605, MF risk markers 611, and CI risk markers 617.

Process 210 of Stage 5 of the PPB method 200 involves bringing together all streams results of stage 4 in a Combined Risk Profile Table (CRPT) 702.

Processes 211 of Stage 6 of the PPB method 200 involves categorizing all consolidated annual risk events per Patent Professional/Law Firm portfolio (CRPT) 702 according to Bloomberg GIC classification resulting in GIC Risk Table (GICRT) 704.

Process 212 of Stage 7 of the PPB method 200 involve advance calculations and comparisons involving most of the data tables produced during the process so far to result with the Overall Market Score (OMS) and Market Average Score (MAS) and the Patent Practice Benchmark (PPB) 807.

Figure 3:
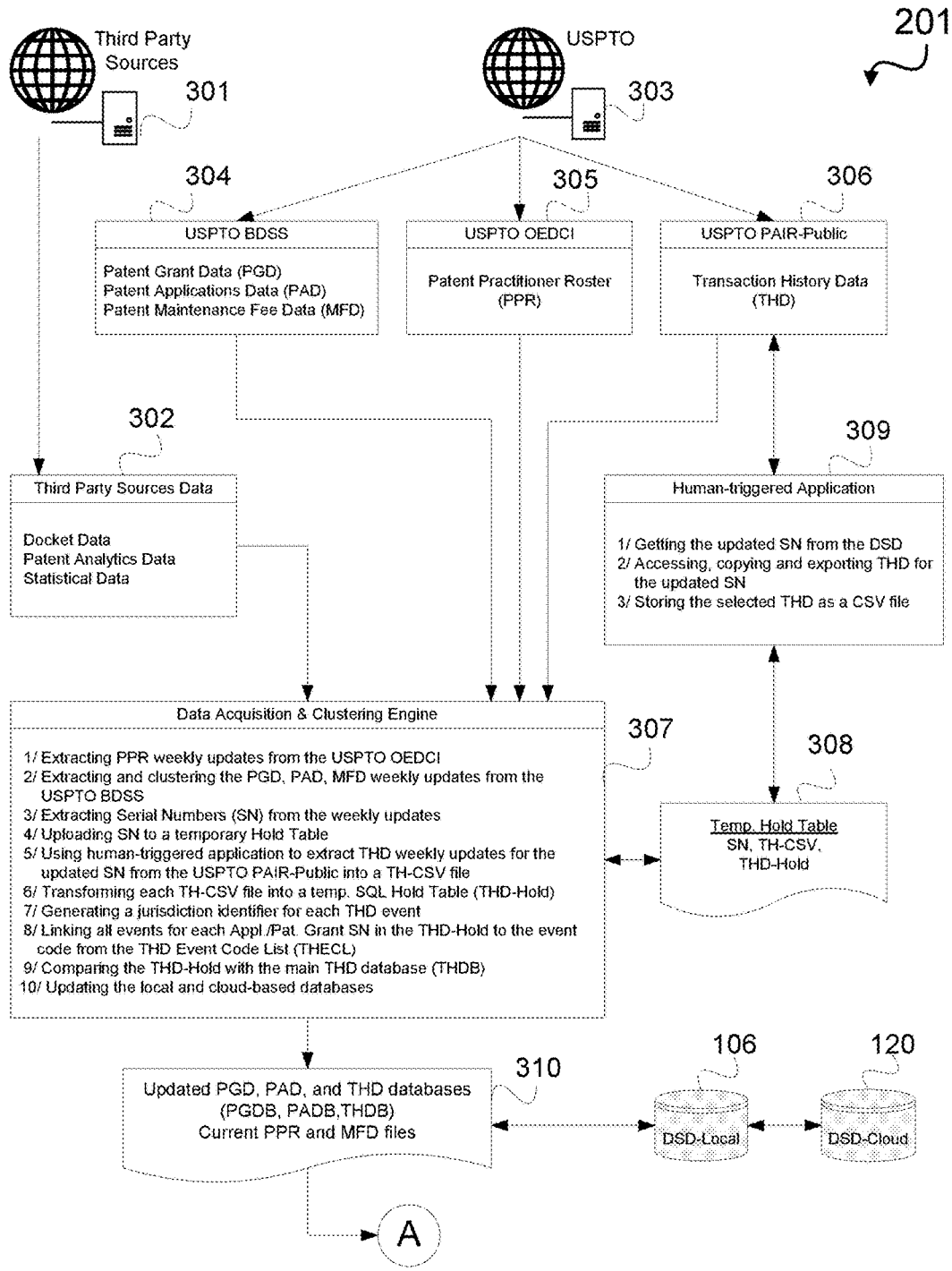
FIG. 3 shows the Data Update Process, according to an exemplary embodiment of the PPB method.

FIG. 3 shows the PPB method 200 data update process 201, according to an exemplary embodiment of the present invention. The initial download of the seed data and buildup of the main Patent Grants Data (PGD), Patent Applications Data (PAD), and Transaction History Data (THD) databases is not shown in FIG. 3 as this is not part of the protection sought for this invention. Methods to access and download public domain data from the USPTO sites are well known in the prior art as disclosed in the U.S. Pat. No. 9,305,278 "System and Methods for compiling Intellectual Property Asset Data" granted to Gross et all in Apr. 5, 2016 and incorporated by reference herein.

Referring back to FIG. 3, we show the USPTO IPO system 303 and three User Interfaces providing access to publicly available data that can be accessed, identified, and downloaded by the Data Acquisition & Clustering Engine 101 via processes outlined at 307 which differ for each data source. The data available from USPTO BDSS 304 includes Patent Grants Data (PGD), Published Patent Applications Data (PAD), Patent Assignment XML Data (PASD), Patent Classification Data (CPC, US MCF), Patents Maintenance Fee Events Data (MFD), typically updated weekly for most of these databases. OEDCI 305 hosts the Patent Practitioner Roster (PPR) that is updated daily. The PAIR-Public System 306 allows access to a wide array of IP data arranged under various tabs including the Transaction History Data (THD) and it's updated on weekly bases. There are also Third Party Sources of IP-related data 301 that could include patent docket data, patent analytics data, or patent statistical data.

The Data Acquisition & Clustering Engine 101 may be configured to utilize one or more APIs to data from one or more patent data stores (e.g., public PAIR, private PAIR, INPADOC, foreign patent offices, patent docketing systems, portfolio management systems, etc). The API-targeted data may include published patent documents, patent applications, office actions or other patent office correspondence, prior art references, claim mappings, dockets dates, annuity payment data and patent or patent application assignment information. Specific assignment data may include details pertaining to the assignor or assignee (e.g. name, address, nationality, place of incorporation), date of assignment, details of the matter being assigned, or any other data pertaining to assignments or change in ownership that may be recorded at any national or regional patent registry such as the USPTO, WIPO or EPO, for example.

An initial download of all IP Asset Data is executed by the Data Acquisition & Clustering Engine 101. That can include active and abandoned files in XML format, which can be downloaded via FTP using specific SSL and ETL processes called USPTO Import, by example. The downloaded data is stored on a local mass DSD 106. After download, the imported data may be standardized into a common format for accessibility, speed of processing, or to match the internal data of the PPB system 100 before being stored at their respective databases PGDB, PADB, and THDB 310 on the local and cloud based DSD 106 and 120 respectively. Data conditioning may include data rearrangement, normalization, filtering, removing duplicates, sorting, binning, or other operations to transform the data into a common format (e.g., using similar date formats and name formats). The PPR and MFD are cumulative files, therefore after their download and processing, they will replace their previous version in the database 310.

The THD data for the year 2016 and on has to be scraped and parsed from the Pair-Public website since it is not yet available for a download via file transfer protocol (FTP). First the Data Acquisition & Clustering Engine 101 extracts the serial numbers (SN) of all patent applications and grants from recent PGD, PAD, and MFD downloads and checks them against PGDB, PADB, and MFDB to filter out SN of the new events only, saving them in a temporary SQL Hold Table 308 afterwards. Thereafter, the PPB method 200 uses a proprietary human triggered application 309 to access the Pair-Public Transaction History Tab for any of the updated SNs, highlights all of the TH events for chosen SN, copy that data and paste it into a TH-CSV file to be downloaded and clustered by all the fields into a SQL Hold Table 308. In the next step, the Data Acquisition & Clustering Engine 101 links all of the updated TH events with their respective event/action codes as listed in the TH Event Code list (THECL) downloaded from the USPTO. A jurisdiction identifier is also generated to link any of the updated TH events with the SNs of their respective patent applications or patent grants. In the final step, the processed TH data from the SQL Hold Table 308 is compared with the permanent THDB 310, which is updated accordingly and stored on the local and cloud based DSD 106 and 120 respectively.

Figure 4:
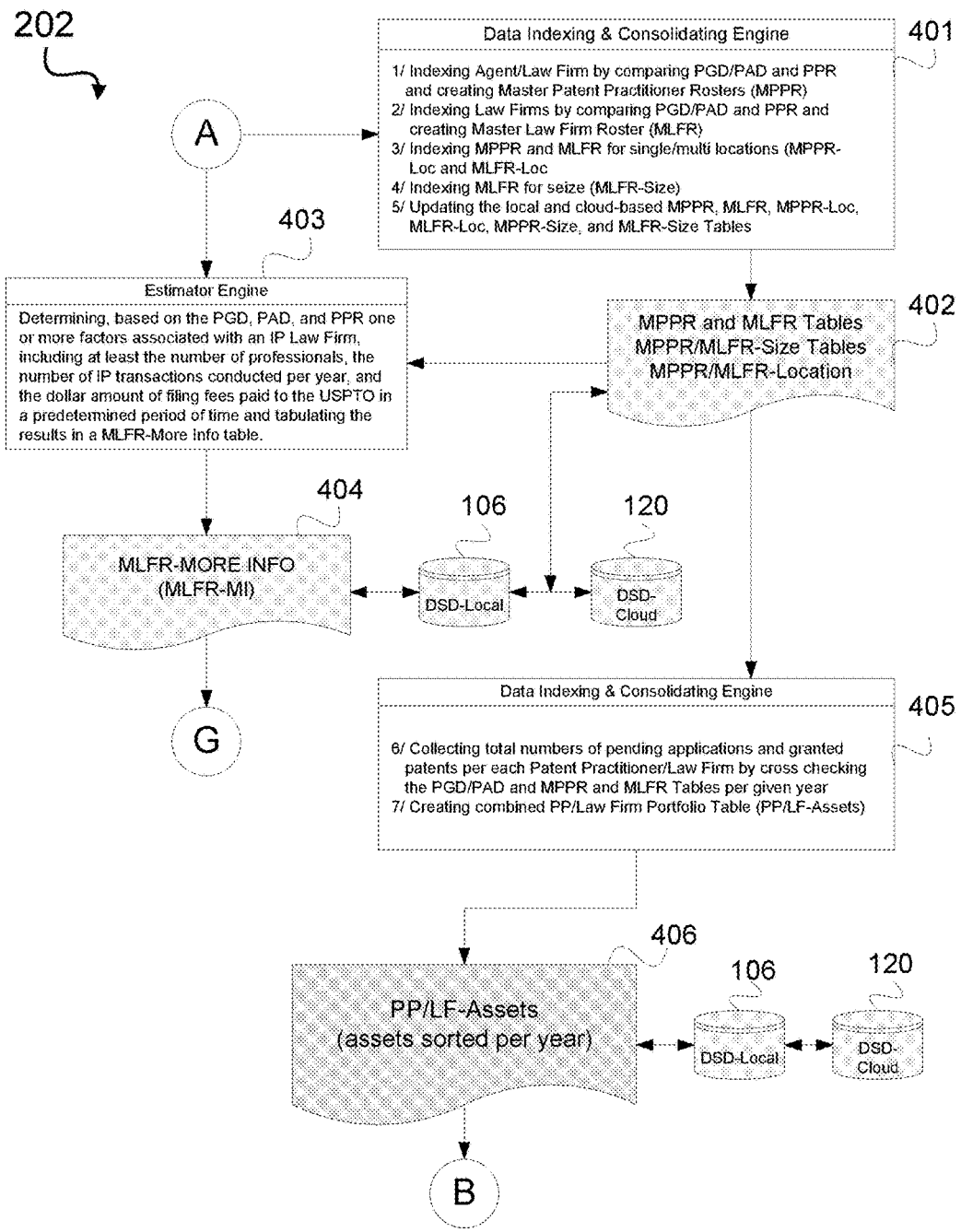
FIG. 4 is a block diagram of the Patent Practitioner/Law Firm Data Indexing and Consolidating, according to an exemplary embodiment of the PPB method.

FIG. 4 shows a process 202 of Indexing and consolidating Patent Practitioners and Law Firms by the Data Indexing & Consolidating Engine 103. Step 1 of the process involves comparing the full text PGD and PAD against the PPR to create Master Patent Practitioner Roster Table and Master Law Firm Roster Table 402 to be saved on the local and cloud based DSD 106 and 120 respectively. During this step, all patent practitioners and law firms names in the PDG/PDA are checked against the PPR for possible variations of spelling, events of omission, similarity, duplication, etc. using the 85% conformity rule resulting in an improved PPR Master List to be used in the further steps of the PPB method 200. The MPPR and MLFR tables are further indexed for single/multi location and for the number of employed professionals to produce the MPPR-Loc, MLFR-Loc and MLFR-Size tables 402 in steps 3 and 4 and stored on the DSD 106 and 120 respectively in step 5. Subsequently, all the 402 Tables are further cross-checked against the PGD/PAD to link them with all the patent applications and patent grants per each patent practitioner or law firm per year in step 6. Step 7 consolidates the resulting indexed data into one portfolio table 406 bringing together the law firm, patent practitioner, and all their active IP cases on annual bases. The resulting PP/LF-Assets Table 406 is updated and stored on the local and cloud based DSD 106 and 120 respectively in step 7.

The other stream of PGD/PAD processing 403 involves the Estimator Engine 105, which determines one or more factors associated with a patent practitioner or an IP law firm, including at least the number of professionals, the number of IP transactions conducted per year, and the dollar amount of filing fees paid to the USPTO in a predetermined period of time and tabulates the results in a MLFR-More Info (MLFR-MI) table 404.

Figure 5A:
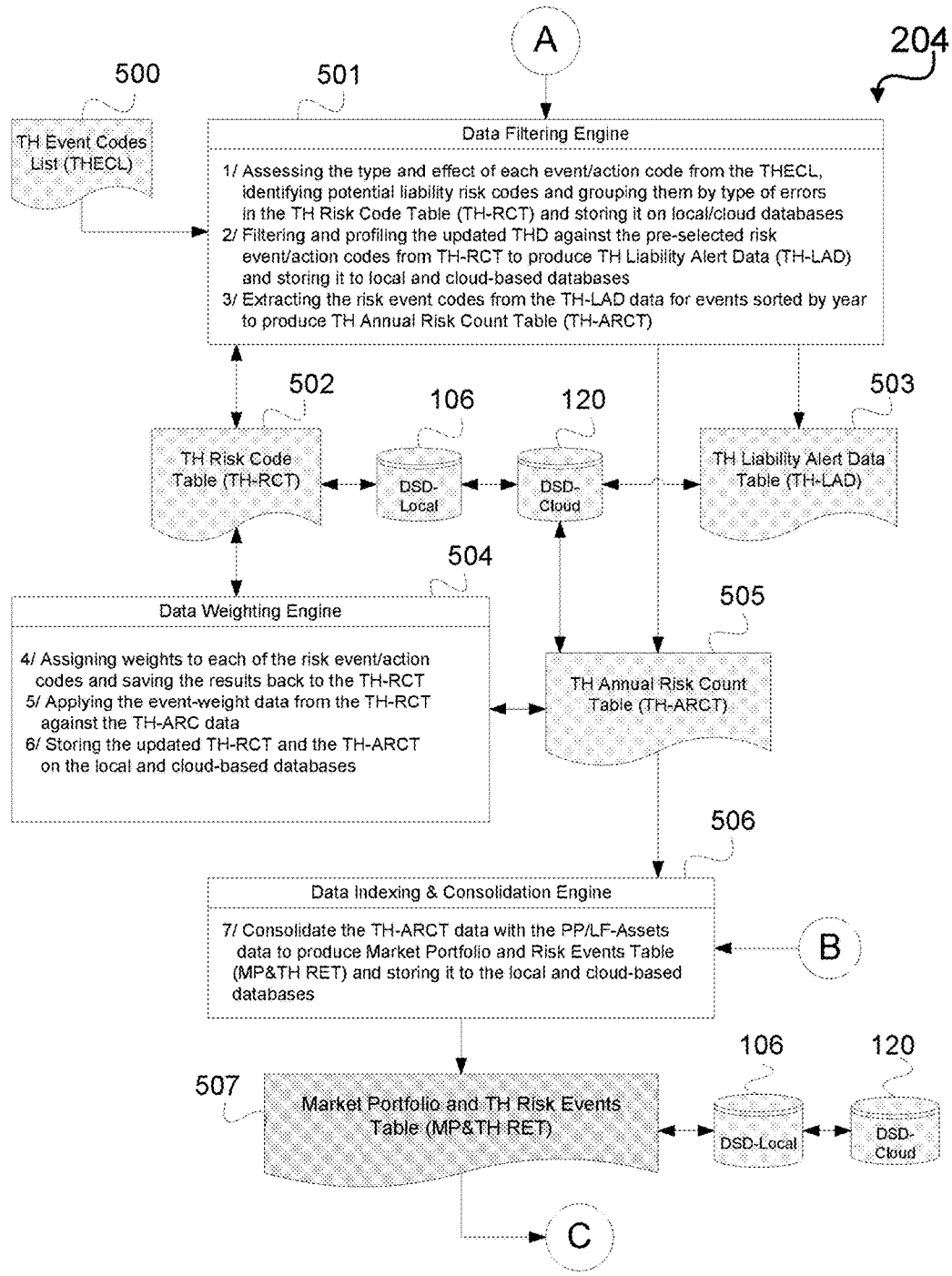
FIG. 5A is a block diagram of the Transaction History Data Preparation stage, according to an exemplary embodiment of the PPB method.

FIG. 5A shows the process 204 of Transaction History (TH) data preparation for further processing involving the Data Filtering Engine 102 (steps 1-3), the Data Weighting Engine 104 (steps 4-6), and the Data Indexing & Consolidation Engine 103 (step 7).

Step 1 of the process involves assessing the type and effect of each event/action code from the TH Event Code List (THECL) 500 downloaded form the USPTO site, identifying potential liability risk codes and grouping them by type of errors in the TH Risk Code Table (TH-RCT) 502 and storing it on the local and cloud-based DSD 106 and 120 respectively. Step 2 involves filtering and profiling the updated THD against the pre-selected risk event/action codes from TH-RCT 502 to produce TH Liability Alert Data (TH-LAD) 503 and storing it to the local and cloud-based DSD 106 and 120 respectively. Step 3 involves extracting the risk event codes from the TH-LAD 503 for risk event sorted year by year to produce TH Annual Risk Count Table (TH-ARCT) 505. In step 4 of the process, the Data Weighting Engine 104 analyses the seriousness and assigns a weight to each of the event/action codes and adds that information to the TH-RCT 502. Step 5 involves indexing the TH-ARCT 505 data by the risk event/action code-weight pairs and storing the updated TH-RCT 502 and TH-ARCT 505 on the local and cloud-based DSD 106 and 120 respectively in step 6. Step 7 is performed by the Data Indexing & Consolidation Engine 103 and involves consolidating the TH-ARCT 505 data with the PP/LF-Assets 404 portfolio data to create the Market Portfolio and TH Risk Events Table (MP&TH RET) 507 to the local and cloud-based DSD 106 and 120 respectively.

Figure 5B:
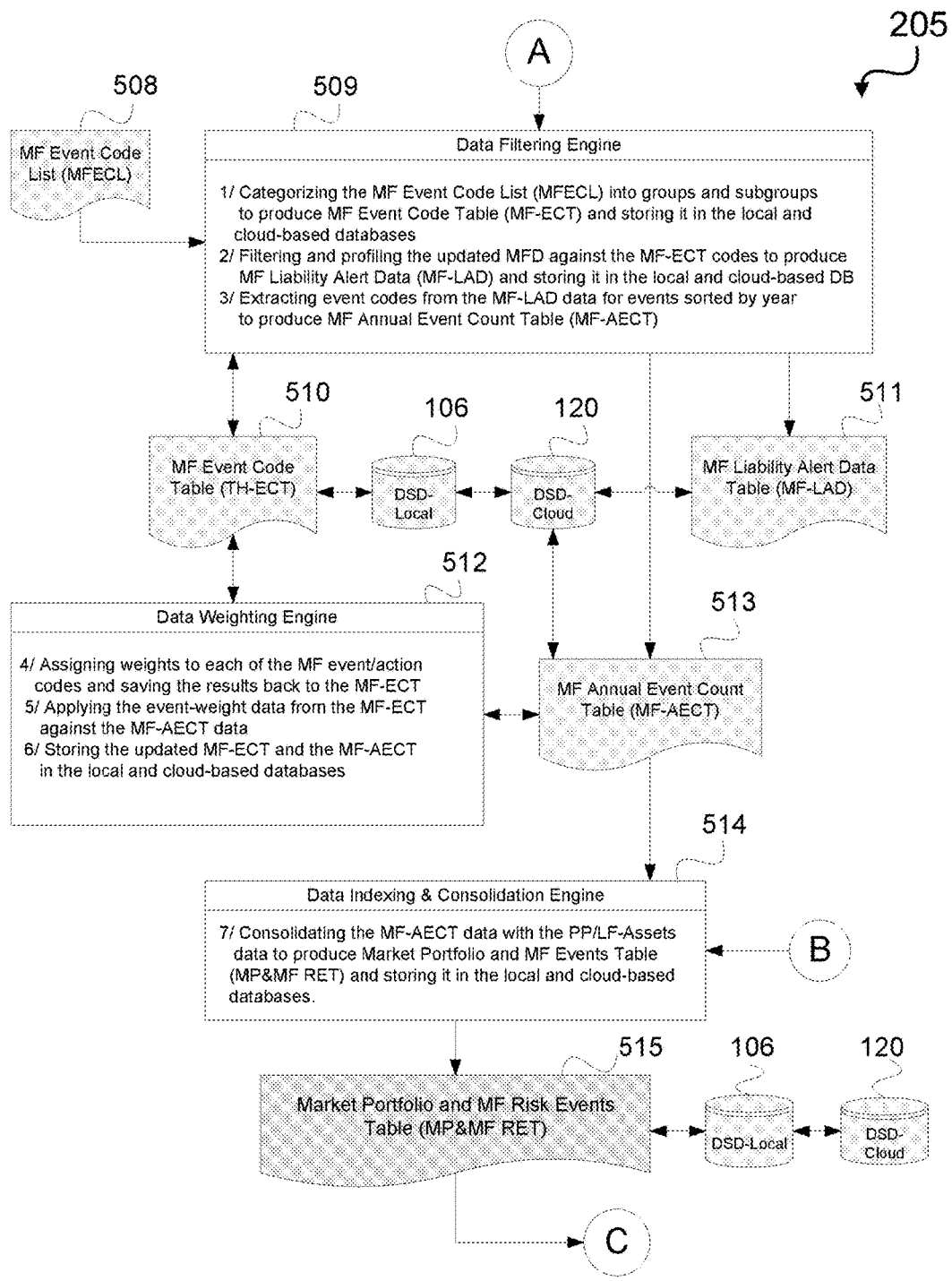
FIG. 5B is a block diagram of the Maintenance Fees Data Preparation stage, according to an exemplary embodiment of the PPB method.

FIG. 5B shows the process 205 of Maintenance Fee Events (MF) data preparation for further processing involving the Data Filtering Engine 102 (steps 1-3), the Data Weighting Engine 104 (steps 4-6), and the Data Indexing & Consolidation Engine 103 (step 7). Step 1 of the process involves assessing the type and effect of each event/action code from the MF Event Code List (MFECL) 508 downloaded form the USPTO site, categorising them into groups and subgroups in the MF Event Code Table (MF-ECT) 510 and storing it on the local/cloud DSD 106 and 120 respectively. Step 2 involves filtering and profiling the updated MFD against the pre-selected event codes from the MF-ECT 510 to produce MF Liability Alert Data (MF-LAD) 511 and storing it to the local and cloud-based DSD DSD 106 and 120 respectively. Step 3 involves extracting the MF event codes from the MF-LAD 511 for MF events sorted year by year to produce the MF Annual Event Count Table (MF-AECT) 513. In step 4 of the process 512 the Data Weighting Engine 104 analyses the seriousness and assigns a weight to each of the MF event codes and adds that information to the MF-ECT 510. Step 5 involves indexing the MF-AECT 513 data by the event code-weight pairs and storing the updated MF-ECT 510 and the MF-AECT 513 on the local and cloud-based DSD 106 and 120 respectively in step 6. Step 7 is performed by the Data Indexing & Consolidation Engine 103 and involves consolidating the MF-AECT 513 data with the PP/LF-Assets Table 404 portfolio data to create the Market Portfolio and MF Risk Events Table (MP&MF RET) 515 stored to the local and cloud-based DSD 106 and 120 respectively.

Figure 5C:
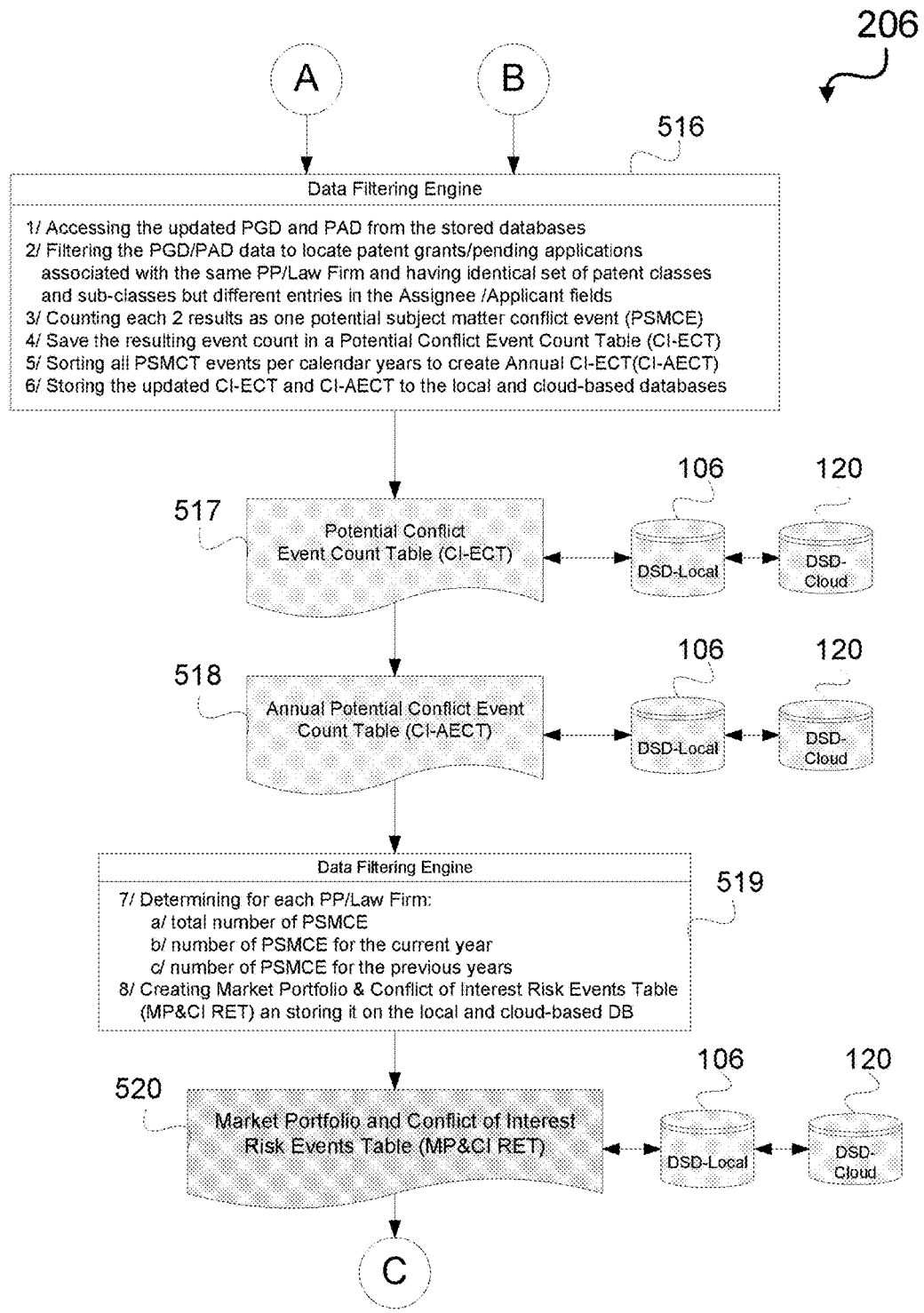
FIG. 5C is a block diagram of the Subject Matter Professional Conflict of Interest Data Preparation stage, according to an exemplary embodiment of the PPB method.

FIG. 5C shows the process 206 of Subject Matter Professional Conflict of Interest (CI) data preparation for further processing involving the Data Filtering Engine 102 (steps 1-8). Step 1 of the process involves accessing the updated PGD and PDA from the PGDB and PADB stored on local and cloud-based DSD 106 and 120 respectively. Step 2 involves filtering the PGD/PAD data to locate patent grants/pending applications associated with the same PP/Law Firm and having identical set of patent classes and sub-classes but different entries in the Assignee/Applicant fields. Is step 3, the total count of potential subject matter conflict events (PSMCE) is divided by 2 to avoid duplication of the same events. In step 4, the resulting event count is saved to in a Potential Conflict Event Count Table (CI-ECT) 517. Step 5 involves sorting all PSMCT events year by year to create Annual CI-ECT (CI-AECT) 518 and storing both tables to the local and cloud-based DSD 106 and 120 respectively in step 6. Step 7 of process 519 involves determining for each PP/Law Firm: a/ total number of PSMCE; b/ number of PSMCE for the current year; c/ number of PSMCE for the previous years. In step 7, all the data is combined and indexed in the Market Portfolio and Conflict of Interest Risk Events Table (MP&CI RET) 520 stored to the local and cloud-based DSD 106 and 120 respectively.

Figure 6A:
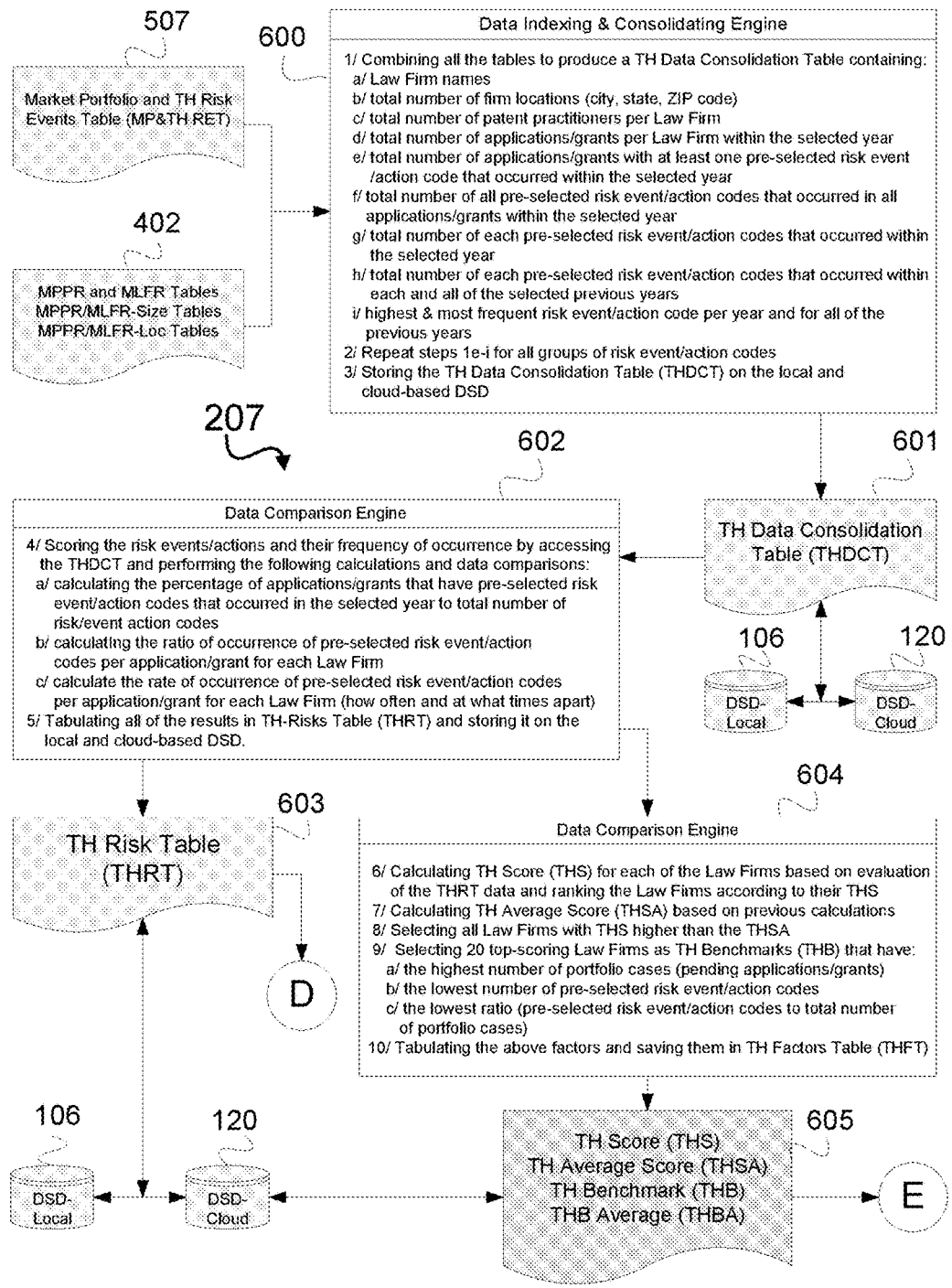
FIG. 6A is a block diagram of the Transaction History Risk Calculation stage, according to an exemplary embodiment of the PPB method.

FIG. 6A shows the process 207 of Transaction History (TH) risk calculations involving the Data Indexing & Consolidation Engine 103 (steps 1-3) and the Data Comparison Engine 107 (steps 4-10). Step 1 of the process 600 involves combining the MP&TH RET 507 with the MPPR, MLFR, MPPR-Loc, MLFR-Loc, and MLFR-Size tables 402 to produce a TH Data Consolidation Table (THDCT) 601 containing: a/ law firm names; b/ total number of firm locations (city, state, ZIP code); c/ total number of patent practitioners per law firm; d/ total number of patent applications/grants per law firm within the selected year; e/ total number of applications/grants with at least one pre-selected risk event/action codes that occurred within the selected year; f/ total number of all pre-selected risk event/action codes that occurred in all applications/grants within the selected year; g/ total number of each pre-selected risk event/action codes that occurred within the selected year; h/ total number of each pre-selected risk event/action codes that occurred within each and all of the selected previous years; i/ highest and most frequent risk event/action codes per year and for all of the previous years. Step 2 involves repeating steps 1*e-i* for all groups of TH risk event/action codes. Step 3 involves storing the THDCT 601 on the local and cloud-based DSD 106 and 120 respectively.

In step 4 of the process 602, the Data Comparison Engine 107 performs scoring of the TH risk event/action codes and their frequency of occurrence by accessing the THDCT 601 and performing the following calculations and data comparisons: a/ calculating the percentage of applications/grants that have pre-selected risk event/action codes that occurred in the selected year to total number of risk/event action codes; b/ calculating the ratio of occurrence of pre-selected risk event/action codes per application/grant for each Law Firm; c/ calculating the rate of occurrence of pre-selected risk event/action codes per application/grant for each Law Firm (how often and at what times apart). Step 5 of the process 602 involves tabulating all of the results in the TH-Risks Table (THRT) 603 and storing it on the local and cloud-based DSD 106 and 120 respectively.

Step 6 of the process 604 involves the Data Comparison Engine 107 calculating the TH Score (THS) for each of the Law Firms based on evaluation of the THRT 603 data and ranking the Law Firms according to their THS. Step 7 involves calculating TH Average Score (THSA) based on previous calculations. Step 8 involves selecting all Law Firms with THS higher than the THSA. Step 9 involves selecting 20 top-scoring Law Firms that have: a/ the highest number of portfolio cases (pending applications/grants); b/ the lowest number of pre-selected risk event/action codes; c/ the lowest ratio of pre-selected risk event/action codes to total number of portfolio cases as the industry TH Benchmark (THB). Step 10 involves tabulating the above markers and storing them in the TH Markers Table (THMT) 605 on the local and cloud-based DSD 106 and 120 respectively.

Figure 6B:
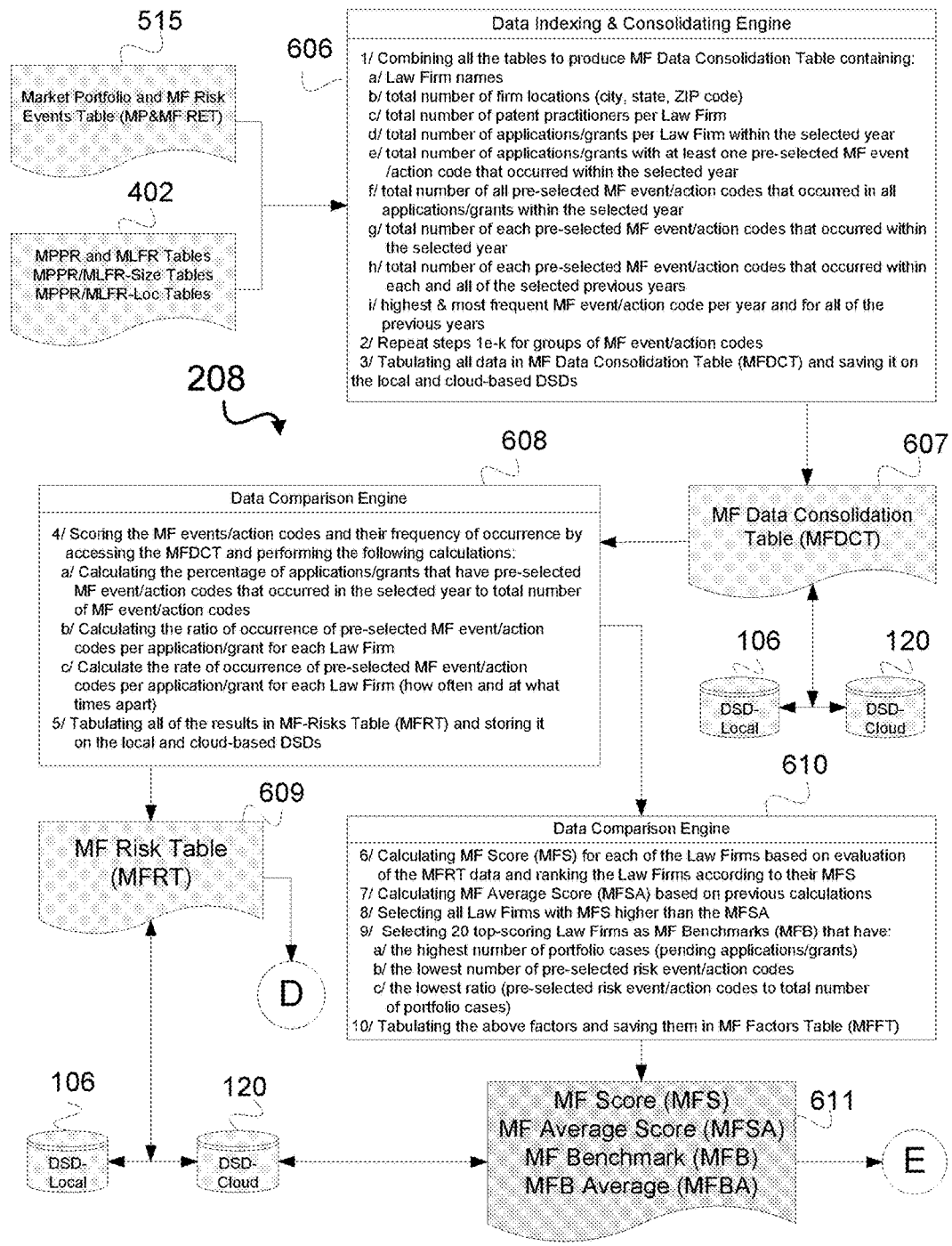
FIG. 6B is a block diagram of the Maintenance Fees Risk Calculation stage, according to an exemplary embodiment of the PPB method.

FIG. 6B shows the process 208 of Maintenance Fee Events (MF) risk calculations involving the Data Indexing & Consolidation Engine 103 (steps 1-3) and the Data Comparison Engine 107 (steps 4-10). Step 1 of the process 606 involves combining the MP&MF RET 515 with the MPPR, MLFR, MPPR-Loc, MLFR-Loc, and MLFR-Size tables 402 to produce a MF Data Consolidation Table (MFDCT) 607 containing: a/ law firm names; b/ total number of firm locations (city, state, ZIP code); c/ total number of patent practitioners per law firm; d/ total number of patent applications/grants per law firm within the selected year; e/ total number of applications/grants with at least one pre-selected MF event/action code that occurred within the selected year; f/ total number of all pre-selected MF event/action codes that occurred in all applications/grants within the selected year; g/ total number of each pre-selected MF event/action codes that occurred within the selected year; h/ total number of each pre-selected MF event/action codes that occurred within each and all of the selected previous years; i/ highest and most frequent MF event/action code per year and for all of the previous years. Step 2 involves repeating steps 1*e-i* for all groups of MF event/action codes. Step 3 involves storing the MFDCT 607 on the local and cloud-based DSD 106 and 120 respectively.

In step 4 of the process 608, the Data Comparison Engine 107 performs scoring of the MF event/action codes and their frequency of occurrence by accessing the MFDCT 607 and performing the following calculations and data comparisons: a/ calculating the percentage of applications/grants that have pre-selected MF event/action codes that occurred in the selected year to total number of MF event action codes; b/ calculating the ratio of occurrence of pre-selected MF event/action codes per application/grant for each Law Firm; c/ calculating the rate of occurrence of pre-selected MF event/action codes per application/grant for each Law Firm (how often and at what times apart). Step 5 of the process 608 involves tabulating all of the results in the MF-Risks Table (MFRT) 609 and storing it on the local and cloud-based DSD 106 and 120 respectively.

Step 6 of the process 610 involves the Data Comparison Engine 107 calculating the MF Score (MFS) for each of the Law Firms based on evaluation of the MFRT 609 data and ranking the Law Firms according to their MFS. Step 7 involves calculating MF Average Score (MFSA) based on previous calculations. Step 8 involves selecting all Law Firms with MFS higher than the MFSA. Step 9 involves selecting 20 top-scoring Law Firms that have: a/ the highest number of portfolio cases (pending applications/grants); b/ the lowest number of pre-selected MF event/action codes; c/ the lowest ratio of pre-selected MF event/action codes to total number of portfolio cases as the industry MF Benchmark (MFB). Step 10 involves tabulating the above markers and storing them in the MF Markers Table (MFFT) 611 on the local and cloud-based DSD 106 and 120 respectively.

Figure 6C:
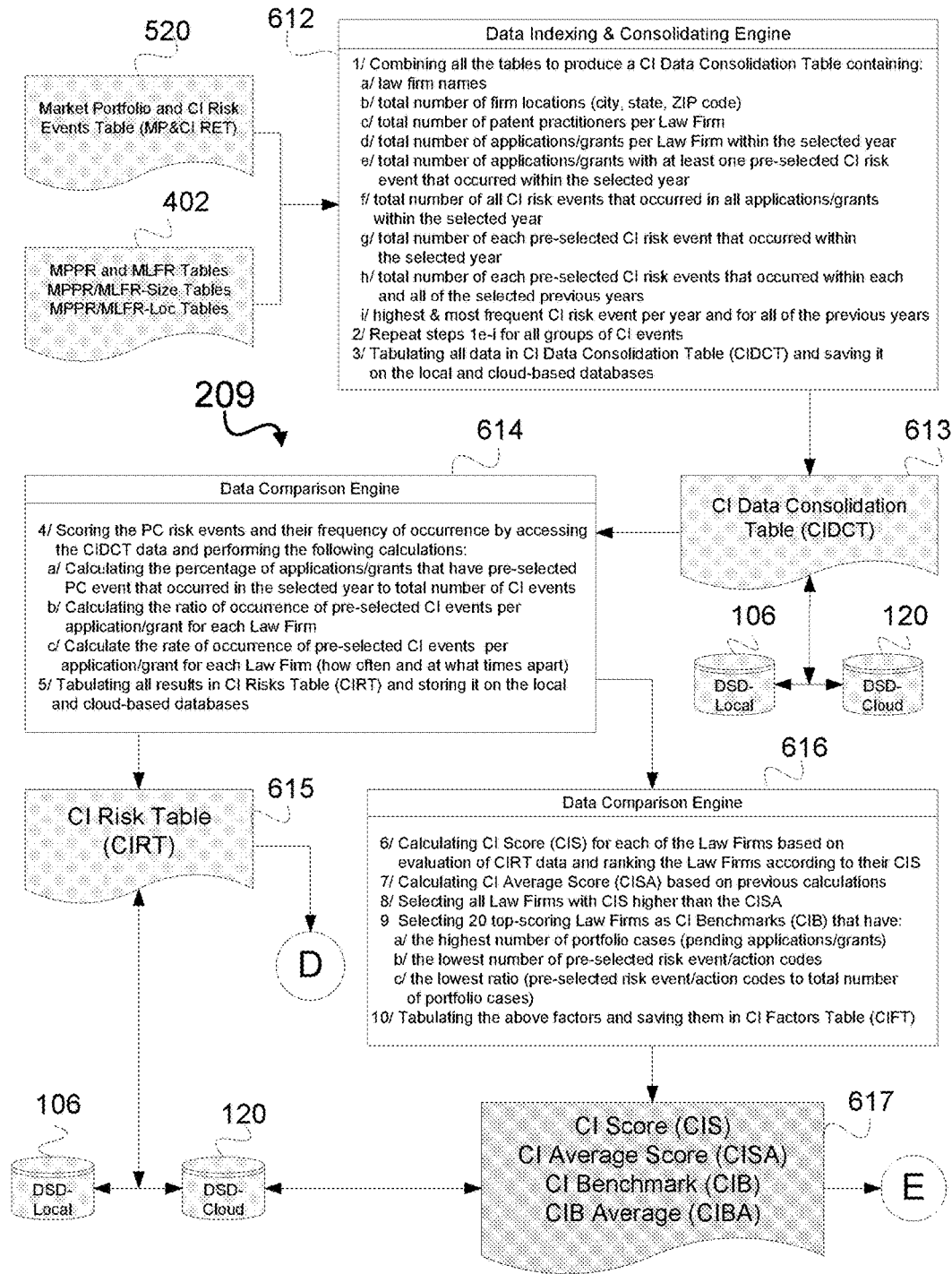
FIG. 6C is a block diagram of the Subject Matter Professional Conflict of Interest Risk Calculation stage, according to an exemplary embodiment of the PPB method.

FIG. 6C shows the process 209 of Subject Matter Professional Conflict of Interest (CI) risk calculations involving the Data Indexing & Consolidation Engine 103 (steps 1-3) and the Data Comparison Engine 107 (steps 4-10). Step 1 of the process 612 involves combining the MP&CI RET 520 with the MPPR, MLFR, MPPR-Loc, MLFR-Loc, and MLFR-Size tables 402 to produce a CI Data Consolidation Table (CIDCT) 613 containing: a/ law firm names; b/ total number of firm locations (city, state, ZIP code); c/ total number of patent practitioners per law firm; d/ total number of patent applications/grants per law firm within the selected year; e/ total number of applications/grants with at least one CI risk event that occurred within the selected year; f/ total number of all CI risk events that occurred in all applications/grants within the selected year; g/ total number of each CI risk event that occurred within the selected year; h/ total number of each pre-selected CI risk event that occurred within each and all of the selected previous years; i/ highest and most frequent CI risk event per year and for all of the previous years. Step 2 involves repeating steps 1*e-i* for all groups of CI risk events. Step 3 involves storing the CIDCT 613 on the local and cloud-based DSD 106 and 120 respectively.

In step 4 of the process 614, the Data Comparison Engine 107 performs scoring of the CI risk events and their frequency of occurrence by accessing the CIDCT 613 and performing the following calculations and data comparisons: a/ calculating the percentage of applications/grants that have pre-selected CI risk event that occurred in the selected year to total number of CI risk events; b/ calculating the ratio of occurrence of pre-selected CI event per application/grant for each Law Firm; c/ calculating the rate of occurrence of CI risk events per application/grant for each Law Firm (how often and at what times apart). Step 5 of the process 614 involves tabulating all of the results in the CI-Risks Table (CIRT) 615 and storing it on the local and cloud-based DSD 106 and 120 respectively.

Step 6 of the process 616 involves the Data Comparison Engine 107 calculating the CI Score (CIS) for each of the Law Firms based on evaluation of the CIRT 615 data and ranking the Law Firms according to their CIS. Step 7 involves calculating CI Average Score (CISA) based on previous calculations. Step 8 involves selecting all Law Firms with CIS higher than the CIAS. Step 9 involves selecting 20 top-scoring Law Firms that have: a/ the highest number of portfolio cases (pending applications/grants); b/ the lowest number of pre-selected CI risk events; c/ the lowest ratio of pre-selected CI risk event to total number of portfolio cases as the industry CI Benchmark (CIB). Step 10 involves tabulating the above markers in the CI Markers Table (CIFT) 617 and storing it on the local and cloud-based DSD 106 and 120 respectively.

Figure 7:
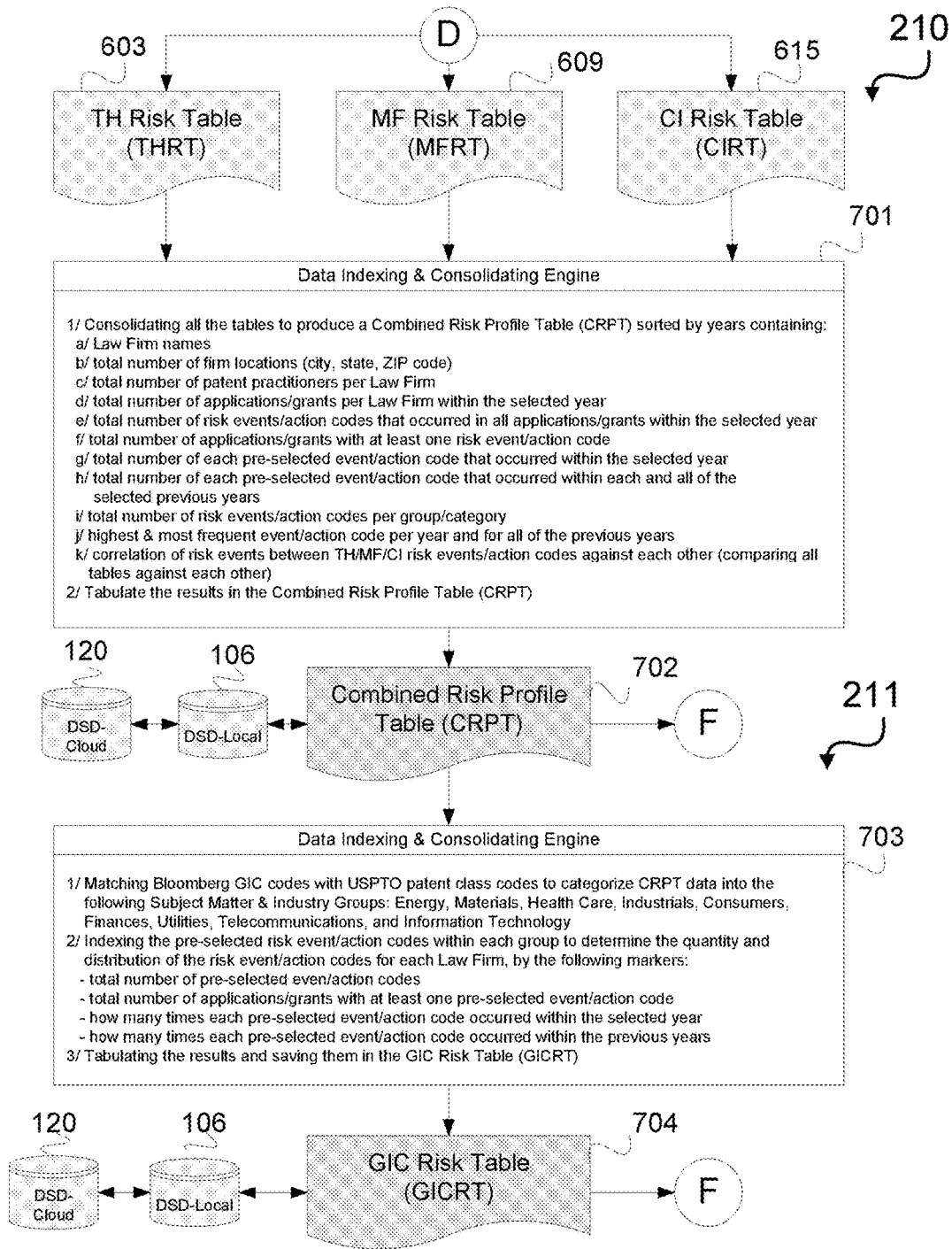
FIG. 7 is a block diagram of the Risk Data Consolidation stage and the Bloomberg GIC data grouping, according to an exemplary embodiment of the PPB method.

FIG. 7 shows stage 5 process 210 of combining all the results from stage 4 by the Data Indexing & Consolidation Engine 103 (steps 1-2) and stage 6 process 211 Bloomberg GIC grouping of the combined portfolio risk data by industry groups done by the Data Indexing & Consolidation Engine 103 (steps 1-3).

Step 1 of the process 701 involves consolidating the data from THRT 603, MFRT 609, and CIRT 615 into one Combined Risk Profile Table (CRPT) 702 sorted by years and containing: a/ law firm names; b/ total number of firm locations (city, state, ZIP code); c/ total number of patent practitioners per Law Firm; d/ total number of applications/grants per law firm within the selected year; e/ total number of risk events/action codes that occurred in all applications/grants within the selected year; f/ total number of applications/grants with at least one risk event/action code; g/ total number of each pre-selected risk event/action code that occurred within the selected year; h/ total number of each pre-selected event/action code that occurred within each and all of the selected previous years; i/ total number of risk events/action codes per group/category; j/ highest & most frequent risk event/action code per year and for all of the previous years; k/ correlation of risk events between TH/MF/CI risk events/action codes against each other (comparing all tables against each other). Step 2 of the process 701 involves tabulating the results in the Combined Risk Profile Table (CRPT) 702 and storing it on the local and cloud-based DSD 106 and 120 respectively.

Process 211 of stage 6 consists of 3 steps done by the Data Indexing & Consolidation Engine 103. Step 1 of the process 211 involves matching Bloomberg GIC codes with the USPTO patent class codes to categorize CRPT 702 data into the following Subject Matter & Industry Groups: Energy, Materials, Health Care, Industrials, Consumers, Finances, Utilities, Telecommunications, and Information Technology. Step 2 involves indexing the pre-selected risk event/action codes within each group to determine the quantity and distribution of the risk event/action codes for each Law Firm, by the following markers: a/ total number of pre-selected even/action codes; b/ total number of applications/grants with at least one pre-selected event/action code; c/ how many times each pre-selected event/action code occurred within the selected year; d/ how many times each pre-selected event/action code occurred within the previous years. Step 3 involves tabulating the results into GIC Risk Table (GICRT) 704 and storing it on the local and cloud-based DSD 106 and 120 respectively.

Figure 8:
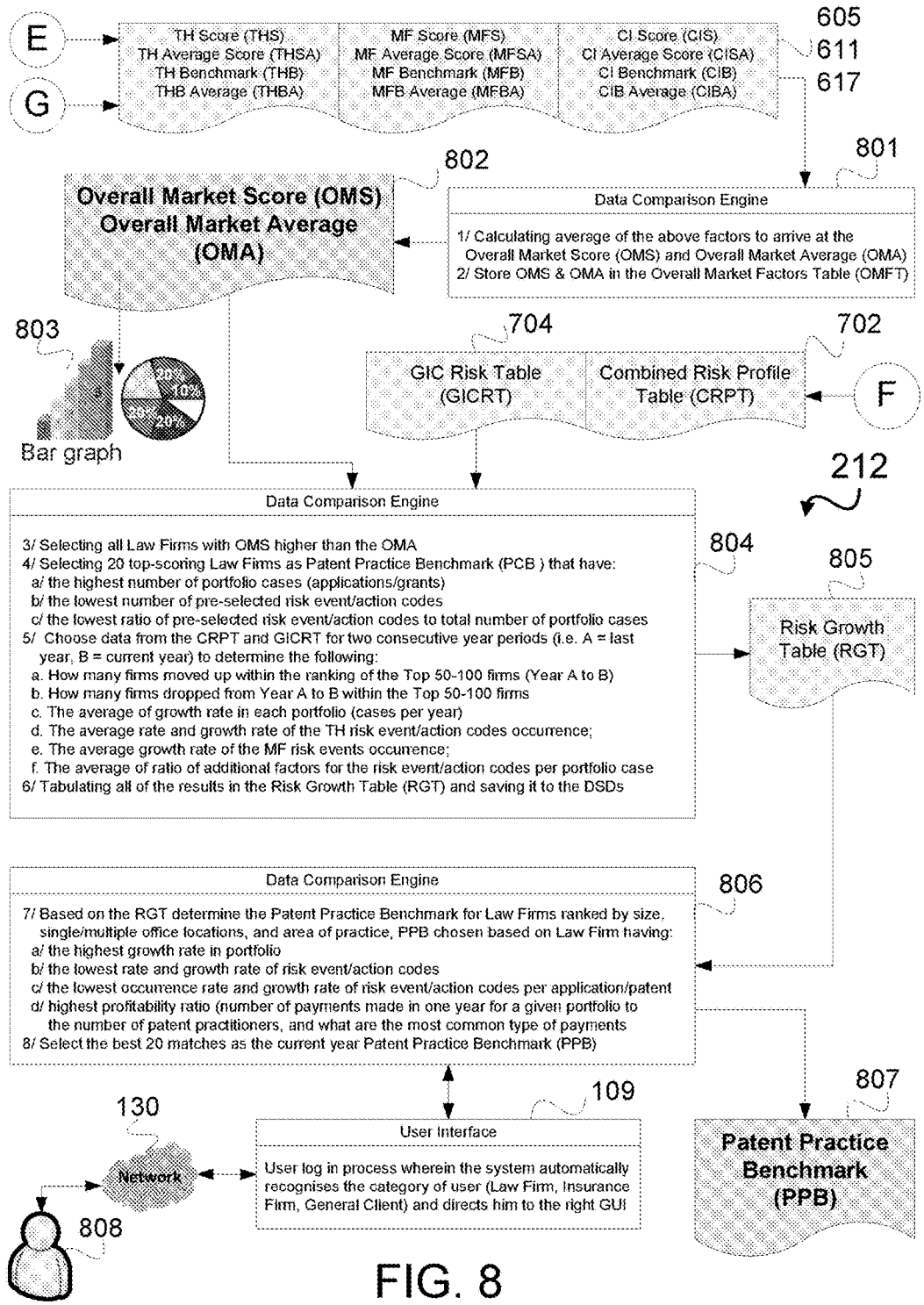
FIG. 8 is a block diagram of the Advanced Calculations stage, according to an exemplary embodiment of the PPB method.

FIG. 8 shows the final process 212 of stage 7 of performing the advanced calculations and data comparisons by the Data Comparison Engine 107 (steps 1-9) to arrive at the Overall Market Score (OMS), the Overall Market Average (OMA), and the Patent Practice Benchmark (PPB) 807 to be used for comparison analyses query or for periodic liability risk analysis reports.

Step 1 of process 801 involves calculating average of the TH, MF, and CI Factors from the TH Factors Table 605 (RHS, THAS, THB, THBA), MF Factors Table 611 (MFS, MFAS, MFB, MFBA), and CI Factors Table 617 (CIS, CIAS, CIB, CIBA) to arrive at Overall Market Score (OMS) and Market Average Score (MAS) and storing them in the Overall Market Factors Table (OMFT) 802 DSD 106 and 120 respectively at step 2.

Step 3 of process 804 involves selecting all Law Firms with OMS higher than the MAS. Step 4 involves selecting 20 top-scoring Law Firms as Patent Practice Benchmark (PPB) 807 that have: a/ the highest number of portfolio cases (applications/grants); b/ the lowest number of pre-selected risk event/action codes; c/ the lowest ratio of pre-selected risk event/action codes to total number of portfolio cases. Step 5 involves choosing data from the CRPT 702 and GICRT 704 related to two consecutive year periods (i.e. A=last year, B=current year) to determine the following: a. How many firms moved up within the ranking of the Top 50-100 firms (Year A to B); b. How many firms dropped from Year A to B within the Top 50-100 firms; c. The average of growth rate in each portfolio (cases per year); d. The average rate and growth rate of the TH risk event/action codes occurrence; e. The average growth rate of the MF risk events occurrence; f. The average of ratio of additional factors (i.e. area of practice, GLT location, frequency of risk events, other) for the risk event/action codes per case. Step 6 involves tabulating all of the results in a transitory Risk Growth Table (RGT) 805 stored in the local and cloud-based DSD 106 and 120 respectively. Step 7 involves determining based on the RGT 805 the Patent Practice Benchmark (PPB) 807 for Law Firms ranked by size, single/multiple office locations, and area of practice, the choice of PPB 807 based on a Law Firm having: a/ the highest growth rate in portfolio; b/ the lowest rate and growth rate of risk event/action codes; c/ the lowest occurrence rate and growth rate of risk event/action codes per application/patent; d/ highest profitability ratio (number of payments made in one year for a given portfolio to the number of patent practitioners, and what are the most common type of payments. Step 8 of the process 806 involves selecting the best 20 matches from the previous analysis as the current year Patent Practice Benchmark (PPB) 807, which is stored in the local and cloud-based DSD 106 and 120 respectively.

As the PPB method 200 data processing and risk calculations are resource and time demanding, and they require on-going updates of the Asset Data, the PPB method 200 analysis and calculations are done in advance. The risk factors are being updated on regular bases (i.e. after each Asset Data update) and stored in the PPB 100 system as a pre-calculated data ready to be used at any time. A user 808 can log in to the PPB System 100 via Network 130 (the Internet in the preferred embodiment) and input a query for a liability risk or liability insurance risk analysis for a pre-selected law firm (Target Entity), upon which the PPB system 100 will output the corresponding risk factors and other relevant data depending on the user 808 access privileges.

Each user of PPB System 100 will be required to create an account providing his/her name, company name, address, phone number and email as well as disclosure whether he/she is a law firm, insurance company, or a general client. This identification type, if approved, will determine the user's display (law firm/insurance firm/general client) once the account is activated. The user must select a UserID (email or combination of choice) and a password (combination of choice). Once this request is submitted. The account request will be reviewed by an account manager who will assess client's requirements and upon approval the accountant will be activated.

Figure 9:
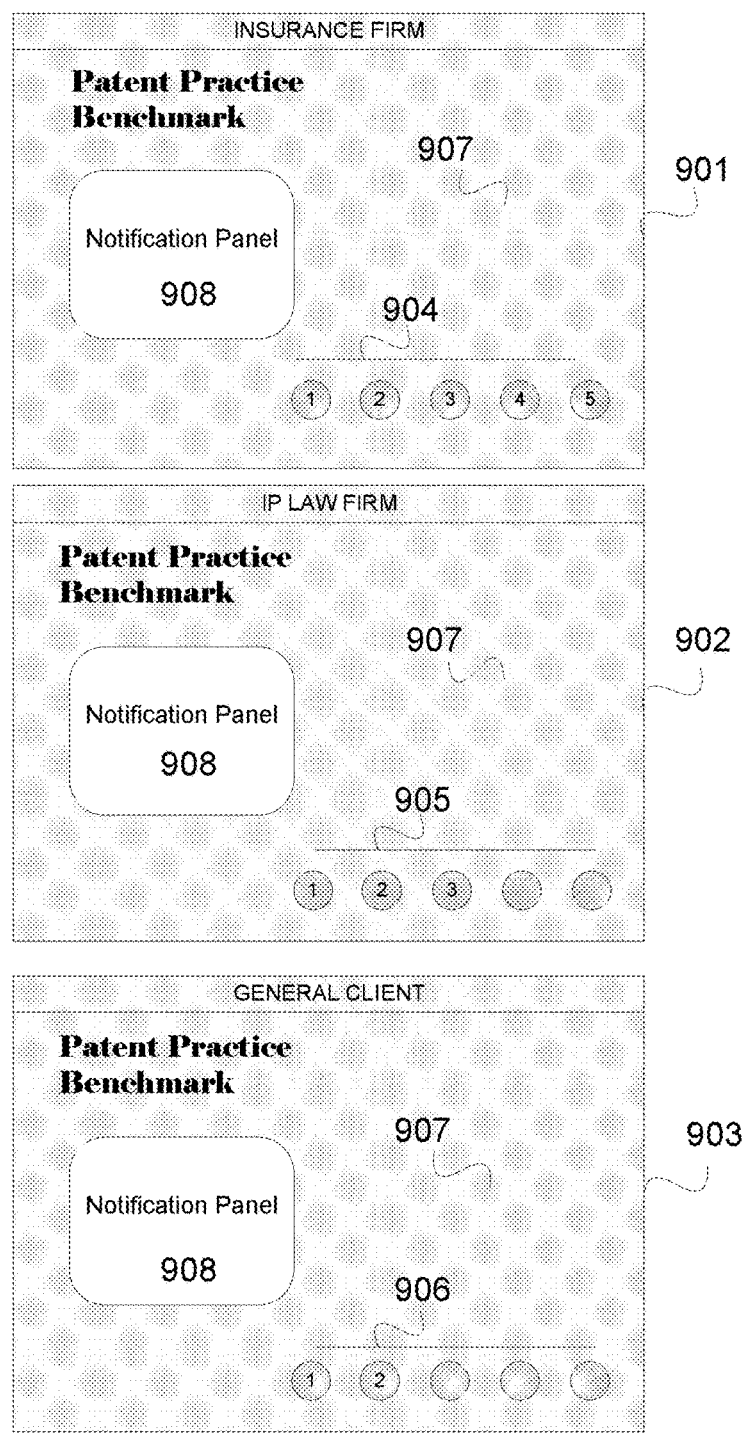
FIG. 9 is an exemplary layout of a user-dependent GUI of the PPB system, according to an exemplary embodiment of the present invention.

FIG. 9 shows three exemplary dashboards of a user-dependant GUI of the PPB computer-based system 100: an Insurance Firm Dashboard 901, IP Law Firm Dashboard 902, and a General Client Dashboard 903. Graphically, the dashboard layouts are similar and feature the same kind of buttons 904, 905, 906, and risk performance gauges 907, which graphically show the user's risk score (Quotia Score) in relation to the PPB 807. The only difference is in the range of access information provided to each user based on its access privileges, which would be detected automatically after log in. Those GUI examples are shown for introductory reasons alone and make take entirely different visual and functional format upon actual launch of the PPB System 100.

General clients will see a dashboard 903 having only the basic risk information (Overall Market Score (OMS) and Market Average Score (MAS) 802 as well as PPB 807) allowing them to have a basic overview of the liability profile of the IP industry market. Upon request, they may be given access to more information about individual law firms allowing them to have an informed choice of patent professionals or law firms according to their IP protection needs.

Law firms will see a dashboard 902 showing their calendar year risk result tables, charts, and gauges and a notification panel 908 allowing them to request notification if any current year events display certain types of risk events. The risk factors available to the law firms depending upon their requirements and subject to their subscription packages might include: Quotia Score, Quotia Score firm size by agent vs. Benchmark, Quotia Score firm size by portfolio size vs. Benchmark, Quotia Score firm size by agent vs. other firms of the same size, Quotia Score firm size vs. other firms of the same size in a chosen state, Quotia Score firm size vs. other firms of the same size in the overall market, breakdown of payment history vs. Benchmark, breakdown of payment history vs. other firms of the same size, breakdown of payment history vs. other firms in the same state, breakdown of payment history vs. other firms in the same technology area and the same state, breakdown of risk errors by category, breakdown of errors by category comparison vs. Benchmark, breakdown of errors by category comparison vs. other firms of the same size, breakdown of errors by category comparison vs. other firms in the same state, breakdown of errors by frequency of occurrence, breakdown of frequency of occurrence by category of error, breakdown of frequency of occurrence vs. Benchmark, breakdown of frequency of occurrence by category of error vs. Benchmark, breakdown of potential Trademark priority risk profile, if applicable showing risk from Canadian associates filing applications for applicants represented by the USPTO firm/attorney, trend of each of these reports compared to last year up/or down movements, and others. The results can be printed and sent via email.

Insurance firms, in addition to the law firm information, will have the most risk information choices available on the screen, including possibility of having direct access to multiple law firms' dashboards ("one-click approach") on which they will see insurance policy numbers, policy renewal dates, and comparison of a policyholder risk rating to the established PPB Benchmark 807, as well as an array of charts with various risk factors and comparisons as provided by the PPB System 100. They will have also access to a Market & Analysis Panel/Dashboard and Policy Holder RiskInsight Panel/Dashboard. The Market & Analysis Panel/Dashboard can include market overview of errors, location of errors, types of technology, types of portfolio size, types of firm size, types of frequency and others. The Policy Holder RiskInsight Panel/Dashboard can have the following features: a/ ability to add limited but multiple law firms based on subscription fee paid and track based on the same results; b/ additional firms can be added if subscription fee is paid; c/ ability to compare scores and results of firms in insurance portfolio to Benchmark; d/ chart showing risk of occurrence/claims vs. Benchmark by firm and overall insurance portfolio; e/ breakdown of risk events by insurance portfolio vs. Benchmark; f/ ability to select policy renewal date; g/ chart of risk events since last policy renewal by firm and overall insurance portfolio; h/ chart of risk potential reportable claims by firm and overall insurance portfolio; i/ graph of Newbridge results vs. Benchmark; j/ chart of premiums risk identification by firm and overall insurance portfolio; k/ potential liability for prior acts by firm and overall insurance portfolio; l/ breakdown of serious errors in the last 3 years; and m/ detailed subject matter conflict analysis.

In the preceding description, numerous details are set forth in order to provide a thorough understanding of the embodiments. However, it will be apparent to one skilled in the art that these specific details are not required. In other instances, well-known electrical structures and circuits are shown in block diagram form in order not to obscure the understanding. For example, specific details are not provided as to whether the embodiments described herein are implemented as a software, hardware circuit, firmware, or a combination thereof.

Embodiments of the disclosure can be represented as a computer program product stored in a machine-readable medium (also referred to as a computer-readable medium, a processor-readable medium, or a computer usable medium having a computer-readable program code embodied therein). The machine-readable medium can be any suitable tangible, non-transitory medium, including magnetic, optical, or electrical storage medium including a diskette, compact disk read only memory (CD-ROM), memory device (volatile or non-volatile), or similar storage mechanism. The machine-readable medium can contain various sets of instructions, code sequences, configuration information, or other data, which, when executed, cause a processor to perform steps in a method according to an embodiment of the disclosure. Those of ordinary skill in the art will appreciate that other instructions and operations necessary to implement the described implementations can also be stored on the machine-readable medium. These instructions can be executed by a processor or other suitable processing device, and can interface with circuitry to perform the described tasks.

The above-described embodiments are intended to be examples only. Alterations, modifications and variations can be effected to the particular embodiments by those skilled in the art without departing from the scope of present invention, which is defined solely by the claims appended hereto.

What is claimed is:

1. A computer-implemented method for detecting, profiling and benchmarking liability trigger events indicative of performance quality and subject matter conflict of interest of intellectual property (IP) professional practices and susceptible to affect a liability risk profile and a liability insurance risk profile of a target entity engaged in said IP professional practices, including IP professionals employed or representing said target entity, the method comprising:

a. by way of one or more processors that execute a first set of computer-executable statements and instructions, communicating electronically with a National/Regional Intellectual Property Office (IPO) computer system in at least one IP jurisdiction, identifying and extracting Asset Data from said IPO computer system, processing and clustering said extracted Asset Data, generating an IP jurisdiction identifier to associate each document of said Asset Data with the jurisdiction of the corresponding IP document, and storing said IP jurisdiction identifier with said each document of said Asset Data therewith to a data storage device;

b. by way of said one or more processors that execute a second set of computer-executable statements and instructions, indexing and consolidating said Asset Data and selective internal results of calculations and comparisons performed on said Asset Data, and storing the indexed and/or consolidated Asset Data and said selective internal results of calculations and comparisons performed on said Asset Data to said data storage device;

c. by way of said one or more processors that execute a third set of computer-executable statements and instructions, filtering and profiling the processed Asset Data by checking for codes associated with one or more of said liability trigger events indicative of said performance quality and said subject matter conflict of interest of IP professional practices and susceptible to affect said liability risk profile and said liability insurance risk profile of said target entity, including IP professionals employed or representing said target entity, to produce Liability Alert Data, and storing said Liability Alert Data to said data storage device;

d. by way of said one or more processors that execute a fourth set of computer-executable statements and instructions, applying one or more predetermined factors associated with said one or more liability trigger events to said Liability Alert Data to produce Weighted Liability Alert Data, and storing said Weighted Liability Alert Data to said data storage device;

e. by way of said one or more processors that execute a fifth set of computer-executable statements and instructions, determining, based on receiving said processed Asset Data from said storage device, one or more factors associated with said target entity, including at least the number of professional employees, the number of IP transaction conducted, and the dollar amount of filing fees paid in a pre-determined period of time, and to output the resulting information to said data storage device, and/or to a user interface, and/or to a display device; and f. by way of said one or more processors that execute a sixth set of computer-executable statements and instructions, determining said liability risk profile and said liability insurance risk profile of said target entity, including IP professionals employed or representing said target entity, by applying one or more predictive models trained on said Asset Data to said Weighted Liability Alert Data, and outputting said liability risk profile and said liability insurance risk profile to said data storage device, and/or to said user interface, and/or to said display device.

2. The computer-implemented method of claim 1, wherein said subject matter conflict of interest of said IP professional practices of said target entity, is determined by by way of said one or more processors that execute a seventh set of computer executable statements and instructions, further comprising:

a. filtering and profiling said processed Asset Data to find all IP documents associated with the same target entity, including IP professionals employed or representing said target entity, and outputting the resulting documents to said data storage device, and/or to said user interface, and/or to said display device;

b. filtering and profiling further said all IP documents associated with the same target entity, including IP professionals employed or representing said target entity, to find IP documents having identical set of classification classes and subclasses, and outputting the resulting documents to said data storage device, and/or to said user interface, and/or to said display device;

c. filtering and profiling further said IP documents having identical set of classification classes and subclasses to find IP documents having different entries in the Applicant field or in the Assignee field respectively, and outputting the resulting documents to said data storage device, and/or to said user interface, and/or to said display device.

3. The computer-implemented method of claim 1, wherein said one or more IP liability trigger events comprise one or more occurrences of professional practice errors, omissions, events of incompleteness, delay, oversight or mismanagement by said target entity, including IP professionals employed or representing said target entity.

4. The computer-implemented method of claim 1, wherein said liability risk profile and said liability insurance risk profile of said target entity, including IP professionals employed or representing said target entity, comprises at least frequency of occurrence and probability of re-occurrence of said liability trigger events.

5. The computer-implemented method of claim 1, wherein said liability risk profile and said liability insurance risk profile of said target entity, including IP professionals employed or representing said target entity, is determined in one or more predetermined categories including at least area of IP practice, size of IP portfolio, the number of professional employees, types of subject matter, geographical location, and the number of offices of said target entity.

6. The computer-implemented method of claim 1, wherein said liability risk profile and said liability insurance risk profile of said target entity, including IP professionals employed or representing said target entity, are monitored in real-time.

7. The computer-implemented method of claim 1, wherein said liability risk profile of said target entity, including IP professionals employed or representing said target entity, includes a liability risk score of said target entity; and said liability insurance risk profile of said target entity, including IP professionals employed or representing said target entity, includes a liability insurance risk score of said target entity.

8. The computer-implemented method of claim 7, wherein said liability risk profile of said target entity, including IP professionals employed or representing said target entity, includes a liability risk ranking based on said liability risk score of said target entity; and said liability insurance risk profile of said target entity, including IP professionals employed or representing said target entity, includes a liability insurance risk ranking based on said liability insurance risk score of said target entity.

9. The computer-implemented method of claim 8, wherein said liability risk ranking and said liability insurance risk ranking of said target entity, including IP professionals employed or representing said target entity, comprise one or more predetermined benchmarks, based on business entities having the highest liability risk score in said one or more predetermined categories, to rank said target entity against said one or more predetermined benchmarks.

10. The computer-implemented method of claim 1, wherein said user interface includes a. a general client module, said general client module having at least said liability risk score and said liability risk ranking of said target entity, including IP professionals employed or representing said target entity, allowing clients to lower risks associated with choosing an IP law firm or an independent IP service provider, b. a law firm module, said law firm module having at least said liability risk score and said liability risk ranking of IP professionals employed or representing said target entity, allowing law firms to lower liability risks associated with said IP professional practices and susceptible to affect their human resources practices, and c. an insurance firm module, said insurance firm module having at least said liability risk score and said liability risk ranking of said target entity, including IP professionals employed or representing said target entity, allowing insurance firms to mitigate risks associated with providing a liability insurance coverage to said target entity.

11. A computer-based system for detecting, profiling and benchmarking liability trigger events indicative of performance quality and subject matter conflict of interest of intellectual property (IP) professional practices and susceptible to affect liability risk profile and liability insurance risk profile of a target entity engaged in said IP professional practices, including IP professionals employed or representing said target entity, the system comprising:

a. a data acquisition and clustering engine configured to use one or more processors to execute a first set of computer-executable statements and instructions for communicating electronically with a National/Regional Intellectual Property Office (IPO) computer system in at least one IP jurisdiction, identifying and extracting Asset Data from said IPO computer system, processing and clustering said extracted Asset Data, generating an IP jurisdiction identifier to associate each document of said Asset Data with the jurisdiction of the corresponding IP document, and storing said IP jurisdiction identifier with said each document of said Asset Data therewith to a data storage device;

b. a data indexing and consolidating engine configured to use said one or more processors to execute a second set of computer-executable statements and instructions for indexing and consolidating said Asset Data and selective internal results of calculations and comparisons performed on said Asset Data, and storing the indexed and/or consolidated Asset Data and said selective internal results of calculations and comparisons performed on said Asset Data to said data storage device;

c. a data filtering engine configured to use said one or more processors to execute a third set of computer-executable statements and instructions for filtering and profiling the processed Asset Data by checking for codes associated with one or more of said liability trigger events indicative of performance quality and subject matter conflict of interest of IP professional practices and susceptible to affect liability risk profile and said liability insurance risk profile of said target entity, including IP professionals employed or representing said target entity, to produce Liability Alert Data, and storing said Liability Alert Data to said data storage device;

d. a data weighting engine configured to use said one or more processors to execute a fourth set of computer-executable statements and instructions for applying one or more predetermined factors associated with said one or more liability trigger events to said Liability Alert Data to produce Weighted Liability Alert Data, and storing said Weighted Liability Alert Data to said data storage device;

e. an estimator engine configured to use said one or more processors to execute a fifth set of computer executable statements and instructions to determine, based on receiving said processed Asset Data from said storage device, one or more factors associated with said target entity, including at least the number of professional employees, the number of IP transaction conducted, and the dollar amount of filing fees paid in a predetermined period of time, and to output the resulting information to said data storage device, and/or to a user interface, and/or to a display device;

f. a data comparison engine configured to use said one or more processors to execute a sixth set of computer executable statements and instructions to determine said liability risk profile and said liability insurance risk profile of said target entity, including IP professionals employed or representing said target entity, by applying one or more predictive models trained on said Asset Data to said Weighted Liability Alert Data, and outputting said liability risk profile and said liability insurance risk profile to said data storage device, and/or to said user interface, and/or to said display device; said data comparison engine configured further to use said one or more processors to execute a seventh set of computer executable statements and instructions to determine said subject matter conflict of interest of IP professional practices of said target entity by filtering and profiling said processed Asset Data to find all documents associated with the same target entity, filtering and profiling further the results to find documents having identical set of classification classes and subclasses, filtering and profiling further the results to find documents having different entries in the Applicant field or in the Assignee field respectively, and outputting the resulting documents to said data storage device, and/or to said user interface, and/or to said display device;

g. a data storage device comprising at least one database configured to store at least one of said first through seventh sets of computer executable statements and instructions, said data storage device configured further to receive and store said Asset Data from said IPO computer system in at least one IP jurisdiction and third party sources data; said data storage device configured further to receive and store all internal data of said computer-based system;

h. a user interface configured to allow for a two-way communication between said computer-based system and at least one user of said computer-based system, including receiving an input from said at least one user and displaying information received from said computer-based system in response to said input from said at least one user;

i. a search engine configured to use said one or more processors to execute an eighth set of computer-executable statements and instructions to receive an input from said at least one user via said user interface and to automatically retrieve corresponding information from said computer-based system in response to said at least one user input; said search engine configured further to output said corresponding information to said user interface; and j. communication means, configured to enable a two-way communication between said computer-based system and said at least one user via said user interface; said communication means configured further to allow for data transfer from said IPO computer system in at least one IP jurisdiction and from third-party data sources.

12. A non-transitory computer-readable medium having computer executable statements and instructions stored thereon, said executable statements and instructions adapted to be executed by one or more processors of a computer-based system for detecting, profiling and benchmarking liability trigger events indicative of performance quality and subject matter conflict of interest of intellectual property (IP) professional practices and susceptible to affect liability risk profile and liability insurance risk profile of a target entity engaged in said IP professional practices, including IP professionals employed or representing said target entity, said executable statements and instructions comprising:
  a. a first set of computer-executable statements and instructions for communicating electronically with a National/Regional Intellectual Property Office (IPO) computer system in at least one IP jurisdiction, identifying and extracting Asset Data from said IPO computer system, processing and clustering said extracted Asset Data, generating an IP jurisdiction identifier to associate each document of said Asset Data with the jurisdiction of the corresponding IP document, and storing said IP jurisdiction identifier with said each document of said Asset Data therewith to a data storage device;
  b. a second set of computer-executable statements and instructions for indexing and consolidating said Asset Data and selective internal results of calculations and comparisons performed on said Asset Data, and storing the indexed and/or consolidated Asset Data and said selective internal results of calculations and comparisons performed on said Asset Data to said data storage device;
  c. a third set of computer-executable statements and instructions for filtering and profiling the processed Asset Data by checking for codes associated with one or more of said liability trigger events indicative of said performance quality and said subject matter conflict of interest of IP professional practices and susceptible to affect said liability risk profile and said liability insurance risk profile of said target entity, including IP professionals employed or representing said target entity, to produce Liability Alert Data, and storing said Liability Alert Data to said data storage device;
  d. a fourth set of computer-executable statements and instructions for applying one or more predetermined factors associated with said one or more liability trigger events to said Liability Alert Data to produce Weighted Liability Alert Data, and storing said Weighted Liability Alert Data to said data storage device;
  e. a fifth set of computer-executable statements and instructions to determine, based on receiving said processed Asset Data from said storage device, one or more factors associated with said target entity, including at least the number of professional employees, the number of IP transaction conducted, and the dollar amount of filing fees paid in a pre-determined period of time, and to output the resulting information to said data storage device, and/or to a user interface, and/or to a display device;
  f. a sixth set of computer-executable statements and instructions to determine said liability risk profile and said liability insurance risk profile of said target entity, including IP professionals employed or representing said target entity, by applying one or more predictive models trained on said Asset Data to said Weighted Liability Alert Data, and outputting said liability risk profile and said liability insurance risk profile to said data storage device, and/or to said user interface, and/or to said display device;
  g. a seventh set of computer executable statements and instructions to determine said subject matter conflict of interest of IP professional practices of said target entity by filtering and profiling said processed Asset Data to find all documents associated with the same target entity, filtering and profiling further the results to find documents having identical set of classification classes and subclasses, filtering and profiling further the results to find documents having different entries in the Applicant field or in the Assignee field respectively, and outputting the resulting documents to said data storage device, and/or to said user interface, and/or to said display device; and
  h. an eighth set of computer-executable statements and instructions to receive an input from at least one user via said user interface and to automatically retrieve corresponding information from said computer-based system in response to said at least one user input, and to output said corresponding information to said user interface.

13. The non-transitory computer-readable medium of claim 12 having said computer executable statements and instructions stored thereon, wherein said one or more liability trigger events comprise one or more occurrences of professional practice errors, omissions, events of incompleteness, delay, oversight or mismanagement by said target entity, including IP professionals employed or representing said target entity.

14. The non-transitory computer-readable medium of claim 12 having said computer executable statements and instructions stored thereon, wherein said liability risk profile and said liability insurance risk profile of said target entity, including IP professionals employed or representing said target entity, comprises at least frequency of occurrence and probability of re-occurrence of said liability trigger events.

15. The non-transitory computer-readable medium of claim 12 having said computer executable statements and instructions stored thereon, wherein said liability risk profile and said liability insurance risk profile of said target entity, including IP professionals employed or representing said target entity, is determined in one or more predetermined categories including at least area of IP practice, size of IP portfolio, the number of professional employees, types of subject matter, geographical location, and the number of offices of said target entity.

16. The non-transitory computer-readable medium of claim 12 having said computer executable statements and instructions stored thereon, wherein said liability risk profile and said liability insurance risk profile of said target entity, including IP professionals employed or representing said target entity, are monitored in real-time.

17. The non-transitory computer-readable medium of claim 12 having said computer executable statements and instructions stored thereon, wherein said liability risk profile of said target entity, including IP professionals employed or representing said target entity, includes a liability risk score of said target entity; and said liability insurance risk profile of said target entity, including IP professionals employed or representing said target entity, includes liability insurance risk score of said target entity.

18. The non-transitory computer-readable medium of claim 17 having said computer executable statements and instructions stored thereon, wherein said liability risk profile of said target entity, including IP professionals employed or representing said target entity, includes a liability risk ranking based on said liability risk score of said target entity; and said liability insurance risk profile of said target entity includes liability insurance risk ranking based on said liability insurance risk score of said target entity.

19. The non-transitory computer-readable medium of claim 18 having said computer executable statements and instructions stored thereon, wherein said liability risk ranking and said liability insurance risk ranking of said target entity, including IP professionals employed or representing said target entity, comprise one or more predetermined benchmarks, based on business entities having the highest liability risk score in said one or more predetermined categories, to rank said target entity against said one or more predetermined benchmarks.

20. The non-transitory computer-readable medium of claim 12 having said computer executable statements and instructions stored thereon, wherein said user interface includes a. a general client module, said general client module having at least said liability risk score and said liability risk ranking of said target entity, including IP professionals employed or representing said target entity, allowing clients to lower risks associated with choosing an IP law firm or an independent IP service provider, b. a law firm module, said law firm module having at least said liability risk score and said liability risk ranking of IP professionals employed or representing said target entity, allowing law firms to lower liability risks associated with said IP professional practices and susceptible to affect their human resources practices, and c. an insurance firm module, said insurance firm module including at least said liability risk score and said liability risk ranking of said target entity, including IP professionals employed or representing said target entity, allowing insurance firms to mitigate risks associated with providing a liability insurance coverage to said target entity.

* * * * *